US012689227B2

(12) United States Patent
Yoon et al.

(10) Patent No.: US 12,689,227 B2
(45) Date of Patent: Jul. 21, 2026

(54) ELECTRONIC DEVICE AND METHOD FOR CONTROLLING BATTERY CHARGING

(71) Applicant: Samsung Electronics Co., Ltd., Gyeonggi-do (KR)

(72) Inventors: Jongmin Yoon, Gyeonggi-do (KR); Seungnyun Kim, Gyeonggi-do (KR); Jeongwon Park, Gyeonggi-do (KR); Chunsik Choi, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 760 days.

(21) Appl. No.: 17/871,306

(22) Filed: Jul. 22, 2022

(65) Prior Publication Data

US 2022/0368145 A1     Nov. 17, 2022

Related U.S. Application Data

(63) Continuation of application No. PCT/KR2021/018677, filed on Dec. 9, 2021.

(30) Foreign Application Priority Data

Dec. 9, 2020     (KR) ........................ 10-2020-0171613

(51) Int. Cl.
*H02J 7/82*          (2026.01)
*G02B 27/01*         (2006.01)
(Continued)

(52) U.S. Cl.
CPC .............. *H02J 7/82* (2026.01); *G02B 27/017* (2013.01); *G06F 3/01* (2013.01); *H02J 7/342* (2020.01);
(Continued)

(58) Field of Classification Search
None
See application file for complete search history.

(56) References Cited

U.S. PATENT DOCUMENTS

| | | | |
|---|---|---|---|
| 2017/0054328 A1* | 2/2017 | Jung | ................... H02J 7/00714 |
| 2017/0085084 A1* | 3/2017 | Daly | .................... G06F 1/3215 |

(Continued)

FOREIGN PATENT DOCUMENTS

| | | |
|---|---|---|
| KR | 10-2013-0039360 A | 4/2013 |
| KR | 101377345 B1 | 3/2014 |

(Continued)

OTHER PUBLICATIONS

Korean Office Action dated Jun. 11, 2025.
Korean Notice of Allowance for KR Application No. 10-2020-0171613 mailed on Feb. 20, 2026.

*Primary Examiner* — Julian D Huffman
*Assistant Examiner* — John P Ondrasik
(74) *Attorney, Agent, or Firm* — CANTOR COLBURN LLP

(57) ABSTRACT

An electronic device may include a housing, a first interface, a second interface, a battery, a charger circuitry, and at least one processor. The at least one processor may determine information on a charging type of the external power supply connected through the first interface, acquire state information of the external electronic device connected through the second interface, acquire state information of the battery, determine a first power that will be supplied to the battery and a second power that will be supplied to the external electronic device, charge the battery based on the first power, and transmit the second power to the external electronic device through the second interface.

18 Claims, 13 Drawing Sheets

(51) Int. Cl.
　　*G06F 3/01*　　　　(2006.01)
　　*H02J 7/34*　　　　(2006.01)
　　*H02J 7/70*　　　　(2026.01)
　　*H02J 7/90*　　　　(2026.01)

(52) U.S. Cl.
　　CPC .............. *H02J 7/731* (2026.01); *H02J 7/933*
　　　　　(2026.01); *G02B 2027/0178* (2013.01)

(56)　　　　　　References Cited

U.S. PATENT DOCUMENTS

| | | | | |
|---|---|---|---|---|
| 2017/0094394 | A1* | 3/2017 | McPeak | .................. H02J 50/10 |
| 2017/0164089 | A1* | 6/2017 | Lee | ...................... H04R 1/1025 |
| 2017/0331321 | A1* | 11/2017 | Kan | .................. H02J 13/00002 |
| 2018/0090958 | A1* | 3/2018 | Steger | .................. H02J 7/0044 |
| 2018/0321730 | A1* | 11/2018 | Mandli | ................ H02J 7/0013 |

| | | | | |
|---|---|---|---|---|
| 2019/0145833 | A1 | 5/2019 | Ryu et al. | |
| 2019/0356137 | A1* | 11/2019 | Balarajashetty | .... H02J 7/00712 |
| 2019/0379216 | A1 | 12/2019 | Yoon et al. | |
| 2020/0321792 | A1* | 10/2020 | Rhee | ................... H02J 7/00034 |
| 2020/0383441 | A1 | 12/2020 | Kan et al. | |
| 2021/0223319 | A1* | 7/2021 | Hayasaki | ........... G01R 31/3646 |
| 2021/0274273 | A1 | 9/2021 | Chawan et al. | |

FOREIGN PATENT DOCUMENTS

| | | | |
|---|---|---|---|
| KR | 10-2017-0039568 | A | 4/2017 |
| KR | 10-2017-0067050 | A | 6/2017 |
| KR | 10-2017-0121524 | A | 11/2017 |
| KR | 10-2018-0073270 | A | 7/2018 |
| KR | 10-2019-0054144 | A | 5/2019 |
| KR | 10-2020-0094606 | A | 8/2020 |
| WO | WO2018066346 | A1 | 4/2018 |

* cited by examiner 101                    200                    500

ELECTRONIC DEVICE AND METHOD FOR CONTROLLING BATTERY CHARGING

CROSS-REFERENCE TO RELATED APPLICATION(S)

This application is a continuation of International Application No. PCT/KR2021/018677 filed on Dec. 9, 2021, which claims priority to Korean Patent Application No. 10-2020-0171613 filed on Dec. 9, 2020 in the Korean Intellectual Property Office, the disclosures of which are herein incorporated by reference.

TECHNICAL FIELD

One or more embodiments of the present disclosure generally relate to an electronic device and a method for controlling the charging of a battery.

BACKGROUND

As communication technologies have developed, wearable electronic devices can be miniaturized and lightened to the extent that they can be used without discomfort even when worn on a user's body. For example, wearable electronic devices such as head-mounted devices (HMDs), smart glasses, contact lens-type devices, ring-type devices, and smart watches (or bands) have been introduced in the market. Since wearable electronic devices are directly worn on the user's body, portability and user accessibility can be improved. These wearable electronic devices (hereinafter, external electronic devices) can be provided together with cases (hereinafter, electronic devices) used for storage and charging of the wearable electronic devices.

Also, external electronic devices can provide various functions. For example, wearable electronic devices can provide a photographing function, a virtual reality (VR) function, an augmented reality (AR) function, a short-range wireless communication (e.g., Bluetooth), Wi-Fi, a near field communication (NFC) function, or an electronic payment function. Accordingly, in order for the external electronic devices to be able to perform these various functions for a long time, the battery capacity of the external electronic device should be maximized.

As the battery capacity of the external electronic device increases, the battery capacity of the electronic device should also increase in order to charge the accommodated external electronic device.

The electronic devices described above may be connect to an external power supply and may charge a battery disposed within the electronic device and the external electronic device accommodated therein through the external power supply, and the electronic device not connected to the external power supply may charge the accommodated external electronic device using the battery disposed within the electronic device.

As battery capacities of the electronic device and the external electronic device are increased, it may be difficult for the electronic device to supply sufficient power to the battery of the electronic device and the accommodated external electronic device, because the external power supply is providing a limited power of about 10 W to 15 W.

When the electronic device and the external electronic device do not receive sufficient power supply from the external power supply, either the electronic device or the external electronic device may be discharged as power is consumed by the execution of functions of the electronic device and/or the external electronic device. In this case, it may be difficult to normally perform the functions of the electronic device and/or the external electronic device. For example, when the electronic device is fully discharged, the electronic device cannot output power from the battery of the electronic device. In this case, the electronic device cannot charge the external electronic device by using the battery of the electronic device. Also, it may be difficult to perform functions of the external electronic device that has to be carried out together with the electronic device. Because the limited power supplied from the external power supply is used as above, balanced power distribution cannot be made between the electronic device and the external electronic device having relatively large battery capacities, so the usability of the electronic device and the external electronic device may be deteriorated.

Certain embodiments disclosed in the present document may provide an electronic device capable of efficiently distributing limited power supplied from an external power supply connected to the electronic device and providing the same to a battery of the electronic device and an external electronic device accommodated therein.

SUMMARY

An electronic device of an embodiment of the present disclosure may include a housing including an internal space for accommodating an external electronic device, a first interface connected to an external power supply in one region of the housing, a second interface connected to the external electronic device in one region of the internal space, a battery disposed inside the housing, a charger circuitry configured to be electrically connected to at least one of the first interface, the second interface, the battery, and the external electronic device, and at least one processor electrically connected to the charger circuitry. The at least one processor may determine information on a charging type of the external power supply connected through the first interface, acquire state information of the external electronic device connected through the second interface, acquire state information of the battery, determine a first power that will be supplied to the battery and a second power that will be supplied to the external electronic device, based on at least one of the state information of the battery, the state information of the external electronic device, the information on the charging type of the external power supply, and information on a previously specified function that will be executed, and charge the battery based on the first power, and transmit the second power to the external electronic device through the second interface.

A method of operating an electronic device of an embodiment of the present disclosure may include detecting that an external power supply is connected through a first interface, determining information on a charging type of the external power supply connected through the first interface, acquiring state information of the external electronic device connected through a second interface, acquiring state information of a battery included in the electronic device, determining a first power that will be supplied to the battery of the electronic device and a second power that will be supplied to the external electronic device, based on the battery state information of the electronic device, the state information of the external electronic device, the information on the charging type of the external power supply, and information on a previously specified function that will be executed, and charging the battery based on the first power, and transmitting the second power to the external electronic device through the second interface.

According to certain embodiments disclosed in the present document, it is possible to efficiently distribute limited power supplied from an external power supply and obtain an optimal use time of an electronic device and an external electronic device.

Also, according to certain embodiments disclosed in the present document, an electronic device and an external electronic device may perform a function at the same time and thus, it is possible to solve an inconvenience where the user has to stop using the electronic device and the external electronic device because either the electronic device or the external electronic device has fully discharged.

In addition, various effects directly or indirectly identified through the present document may be provided.

DETAILED DESCRIPTION

Figure 1:
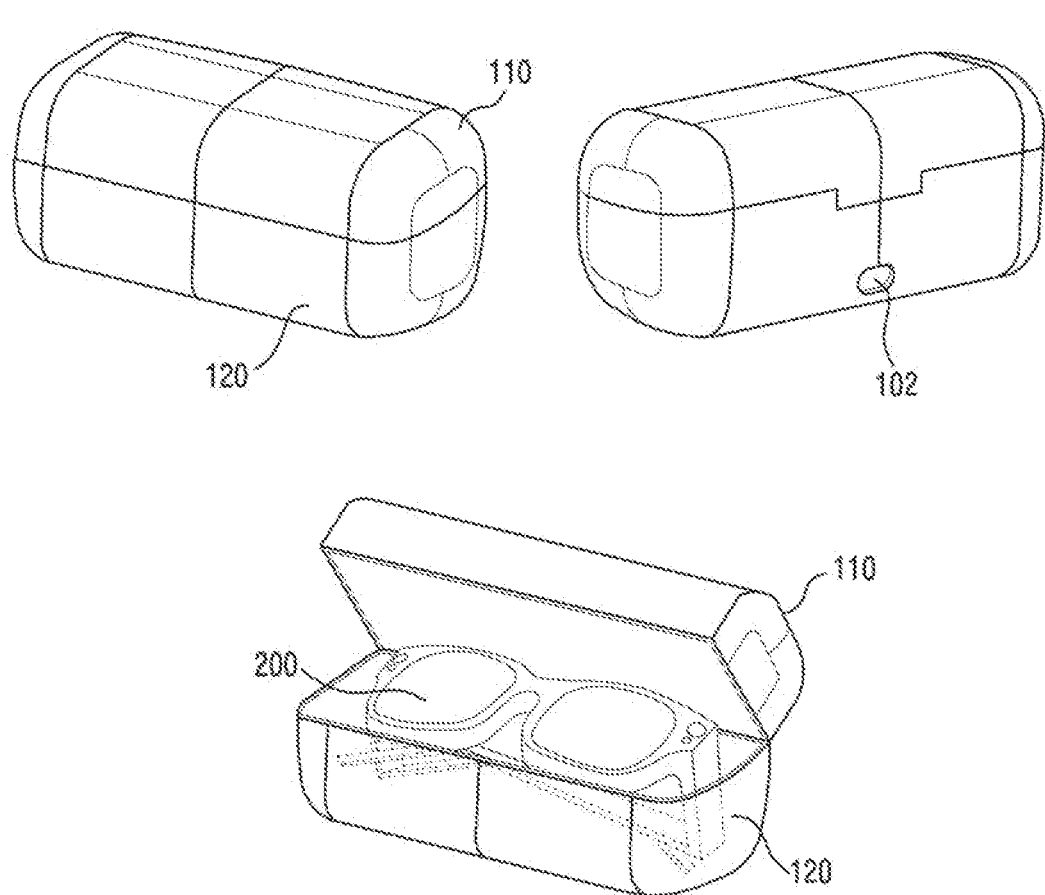
FIG. 1 is a diagram illustrating an electronic device according to an embodiment.

FIG. 1 is a diagram illustrating an electronic device 101 according to an embodiment.

Referring to FIG. 1, in an embodiment, the electronic device 101 may have a substantially rectangular parallelepiped shape, and may include an internal space for accommodating an external electronic device 200. For example, the electronic device 101 may be a case device for the safekeeping of the external electronic device 200.

In an embodiment, the electronic device 101 may include a first housing 110 and a second housing 120. In one example, the first housing 110 and the second housing 120 may be referred to as housings 110 and 120. The first housing 110 and the second housing 120 may be connected rotatably through a hinge module (not shown). For example, the user may open the first housing 110, place the external electronic device 200 in the internal space, and then close the first housing 110.

In an embodiment, the electronic device 101 may include a wired charging interface 102. In one example, the electronic device 101 may be connected to an external power supply through the wired charging interface 102. In one example, the wired charging interface 102 may be an interface according to the USB specification and/or the USB On-the-Go (OTG) specification. In one example, the wired charging interface 102 may include a universal serial bus (USB) connector (e.g., a USB type C connector). In one example, the wired charging interface 102 may be connected to an external power supply source (i.e., a travel adapter (TA) or a battery pack). In an embodiment, the electronic device 101 may include a wireless charging interface (not shown). For example, the electronic device 101 may include a coil for wireless charging. In one example, the electronic device 101 may be electromagnetically connected to an external power supply (e.g., a wireless charging pad) through the wireless charging interface.

Figure 2:
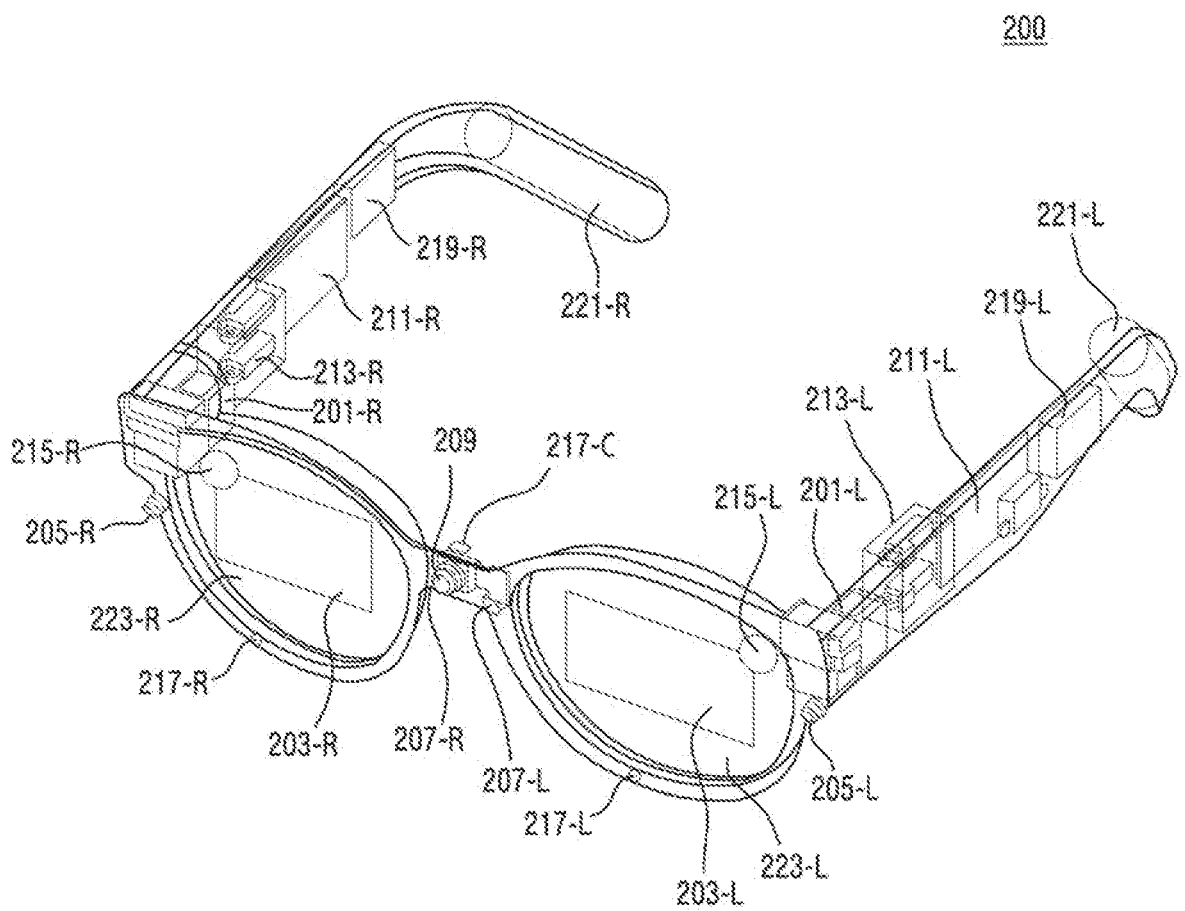
FIG. 2 is a diagram illustrating an external electronic device according to an embodiment.

FIG. 2 is a diagram illustrating the external electronic device 200 according to an embodiment.

In an embodiment, the external electronic device 200 may be accommodated in the electronic device 101. For example, the external electronic device 200 may be accommodated in the internal space of the electronic device 101 in a state in which temples are folded at hinges 213-L and 213-R.

In an embodiment, the external electronic device 200 includes a first light output module 201-L, a second light output module 201-R, a first display 203-L, a second display 203-R, first cameras 205-L and 205-R, second cameras 207-L and 207-R, a third camera 209, a first printed circuit board (PCB) 211-L, a second PCB 211-R, the hinges 213-L and 213-R, a first optical member 215-L, a second optical member 215-R, microphones 217-L, 217-R and 217-C (center), speakers 219-L and 219-R, a first battery 221-L, a second battery 221-R, a first transparent member 223-L, and a second transparent member 223-R.

In an embodiment, "R" and "L" positioned at the ends of reference numerals described in FIG. 2 may refer to components positioned at right and left sides of the external electronic device 200. In one example, a component positioned at the left side when the external electronic device 200 is worn may be driven by power outputted from the first battery 221-L. Similarly, a component positioned at the right side when the external electronic device 200 is worn may be driven by power outputted from the second battery 221-R.

Also, FIG. 2 illustrates that the components (e.g., the first PCB 211-L, the second PCB 211-R, the hinges 213-L and 213-R, the speakers 219-L and 219-R, the first battery 221-L, and the second battery 221-R) positioned on the temple are exposed and visible from the outside, but this is only for description's convenience, and the above components may be positioned inside the temple and thus not exposed.

In an embodiment, the first light output module 201-L and the second light output module 201-R may be referred to collectively as a light output module 201. The first display 203-L and the second display 203-R may be referred to collectively as a display 203. The first PCB 211-L and the second PCB 211-R may be referred to collectively as a PCB 211. The first optical member 215-L and the second optical member 215-R may be referred to collectively as an optical member 215. The first battery 221-L and the second battery 221-R may be referred to as batteries 221-L and 221-R or collectively as a battery 221. The first transparent member 223-L and the second transparent member 223-R may be referred to collectively as a transparent member 223.

In an embodiment, the external electronic device 200 may be a wearable electronic device. For example, the external electronic device 200 may be wearable glasses (e.g., augmented reality glasses (AR glasses), smart glasses, or head mounted device). However, this is only an example, and the present disclosure is not limited thereto. The external electronic device 200 as glasses may be worn on the user's face. The transparent member 223 may be made of a transparent or semitransparent glass plate, a plastic plate, or a polymer material wherein the user may see through the material even when the external electronic device 200 is worn on the user's face. In an embodiment, the first transparent member 223-L may be disposed to face the user's left eye, and the second transparent member 223-R may be disposed to face the user's right eye.

In an embodiment, the external electronic device 200 may acquire (photograph) an image through the third camera 209, and receive an augmented reality object (AR object), which is associated with a location of the acquired image or an object (e.g., a thing or a building) included in the acquired image, from another electronic device (e.g., a smart phone, a computer, a tablet PC, or a server), and present the same to a user through the light output module 201, the optical member 215, and the display 203.

In an embodiment, the first cameras 205-L and 205-R, the second cameras 207-L and 207-R, and the third camera 209 may be utilized for recognizing the external environment viewed through the optical member 215 of the external electronic device 200.

In an embodiment, the external electronic device 200 may receive an audio signal through the microphones 217-L, 217-R, and 217-C, and output an audio signal through the speakers 219-L and 219-R.

In an embodiment, a first charging module (e.g., a first charging module 212-L of FIG. 4A) may be disposed on the first PCB 211-L. The external electronic device 200 may charge the first battery 221-L through the first charging module 212-L. In one example, a second charging module (e.g., a second charging module 212-R of FIG. 4A) may be disposed on the second PCB 211-R. The external electronic device 200 may charge the second battery 221-R through the second charging module 212-R.

Figure 3:
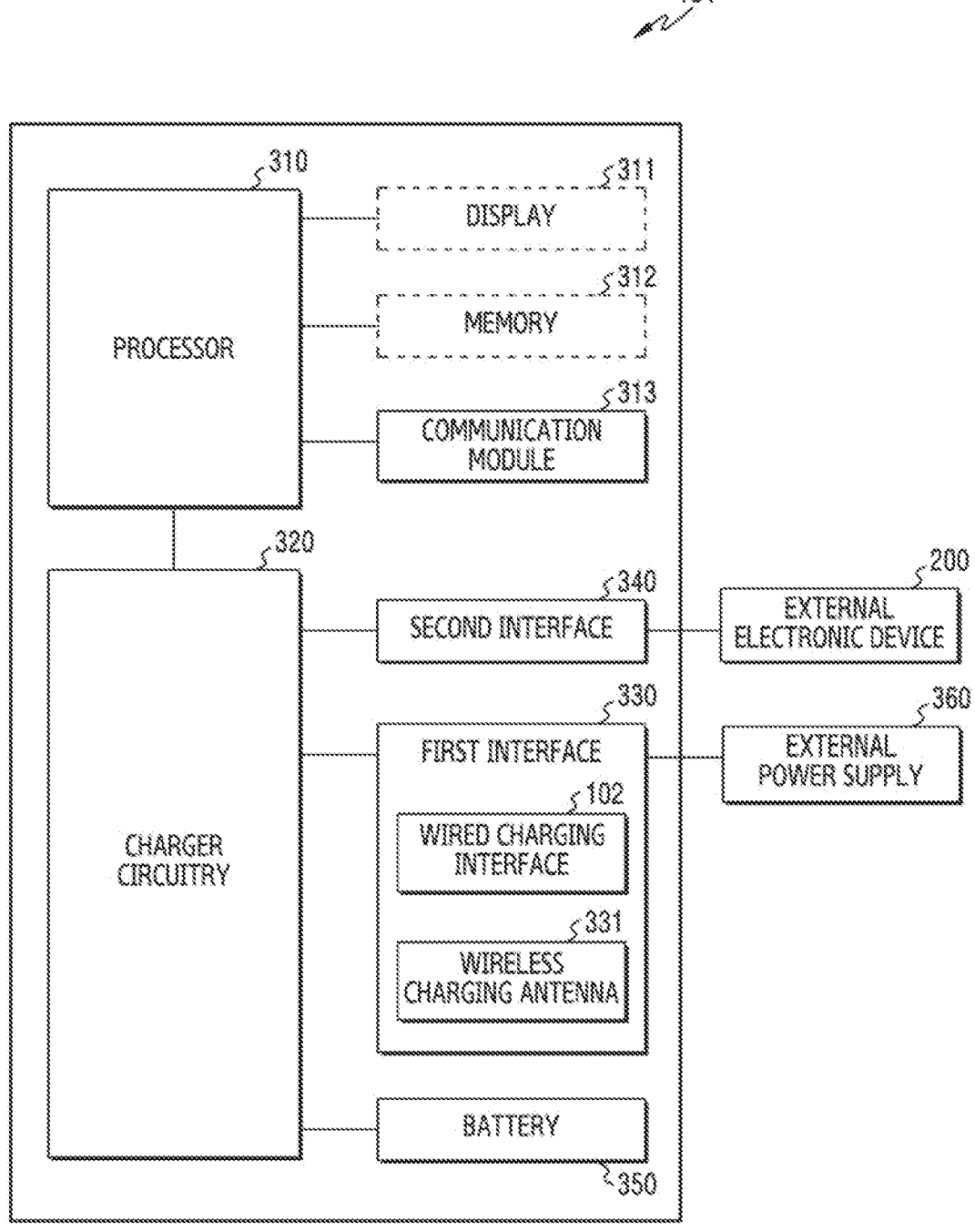
FIG. 3 is a block diagram illustrating components of an electronic device according to an embodiment.

FIG. 3 is a block diagram illustrating components of the electronic device 101 according to an embodiment.

In an embodiment, the electronic device 101 may include a processor 310, a charger circuitry 320, a first interface 330, a second interface 340, and/or a battery 350. In one example, the components of the electronic device 101 illustrated in FIG. 3 may be replaced with other components, or additional components may be included in the electronic device 101. For example, the electronic device 101 may further include a display 311, a memory 312, and/or a communication module 313.

In an embodiment, the processor 310 may execute one or more instructions stored in the memory 312. In one example, the electronic device 101 may include a plurality of processors. The processor 310 may include circuits for processing data, such as an integrated circuit (IC), an arithmetic logic unit (ALU), a field programmable gate array (FPGA), and/or a large scale integration (LSI). The processor 310 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function elements, unless the element is expressly recited using the phrase "means for." In addition, an artisan understands and appreciates that a "processor" or "microprocessor" may be hardware in the claimed disclosure.

In an embodiment, the display 311 may visually output information to the user through the display 311 that is based on at least one of an organic light emitting diode (OLED), a liquid crystal display (LCD), and a light emitting diode (LED). In order to more intuitively control a user interface (UI) outputted through the display 311, the electronic device 101 may include a touch sensor panel (TSP) (not shown) disposed on the display 311. By using at least one of a resistive film, capacitive components, a surface acoustic wave, and infrared rays, the touch sensor panel may obtain a position of an object (e.g., a user's finger or a stylus pen) which touches the display 311 or hovers over the display 311.

In an embodiment, the memory 312 may store data related to the electronic device 101. The memory 312 may include a volatile memory such as a random access memory (RAM) including a static random access memory (SRAM) or a dynamic random access memory (DRAM), and may include a non-volatile memory such as a flash memory, an embedded multimedia card (eMMC) or a solid state drive (SSD) as well as a read only memory (ROM), a magnetoresistive RAM (MRAM), a spin-transfer torque MRAM (STT-MRAM), a phase-change RAM (PRAM), a resistive RAM (RRAM) or a ferroelectric RAM (FeRAM).

Figure 10:
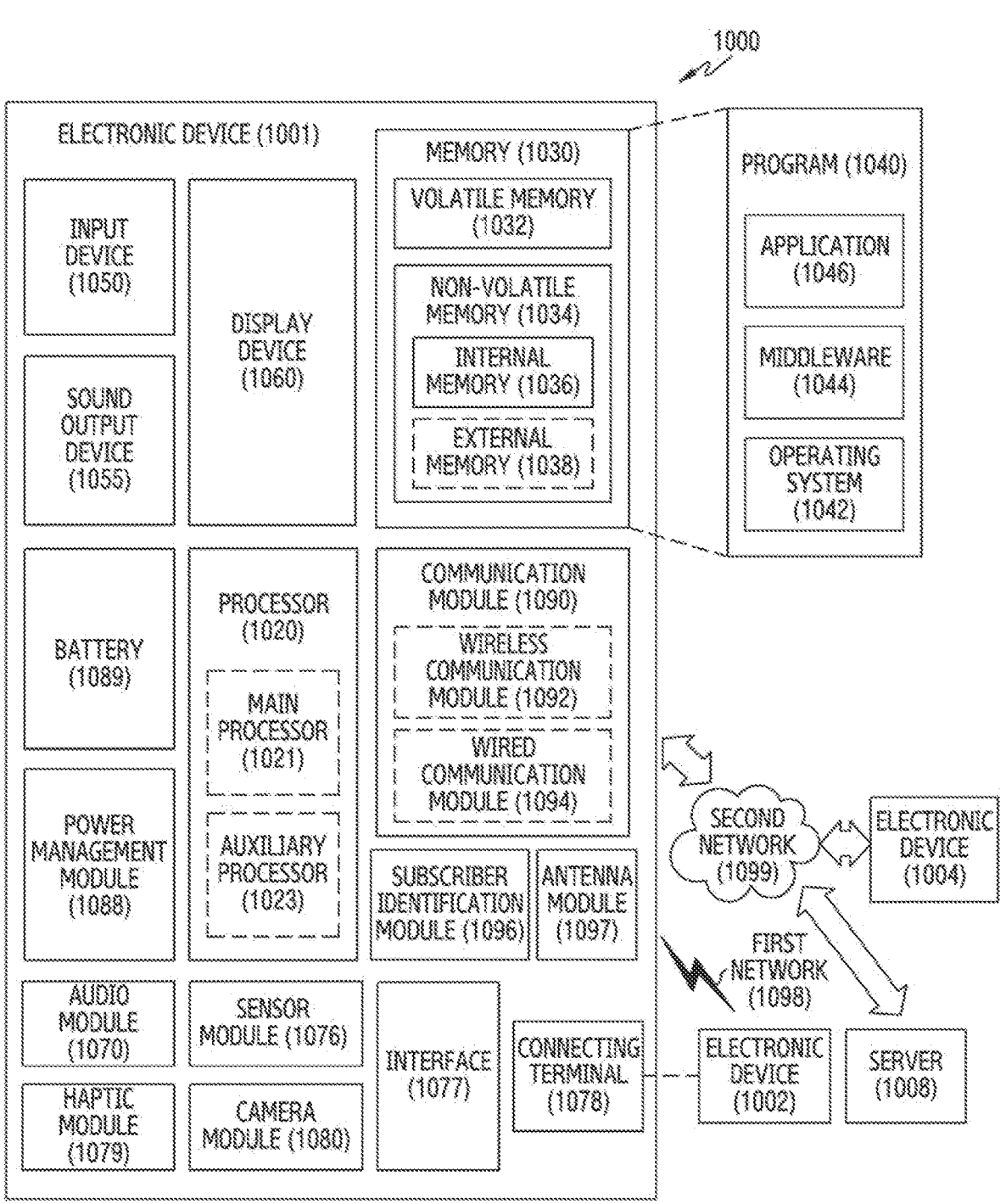
FIG. 10 is a diagram illustrating a network environment including an electronic device according to an embodiment.

In an embodiment, the communication module 313 (e.g., a communication module 1090 of FIG. 10) may support communication between an external electronic device (e.g., the external electronic device 200) or an external device (e.g., an external device 1004 of FIG. 10). For example, the communication module 313 may establish wireless communication with the external electronic device 200 in compliance with a defined communication protocol, and transmit and/or receive a signal or data by using a frequency band supporting the wireless communication. The wireless communication may include, for example, at least one of ultra-wideband (UWB) communication, WiFi communication, WiGig communication, Bluetooth (BT) communication, or Bluetooth low energy (BLE) communication.

In an embodiment, the battery 350 may be a battery cell, a battery module, or a battery pack. The battery 350 may include a capacitor or secondary battery for storing power by charging. The battery 350 may be any one of a lithium-ion battery (Li-ion), a lithium ion polymer battery (Li-ion polymer), a lead storage battery, a nickel-cadmium battery (NiCd), and a nickel hydrogen storage battery (NiMH). When a magnitude of a current supplied to the battery 350 is greater than a magnitude of a current outputted from the battery 350, the battery 350 may be charged. When the magnitude of the current outputted from the battery 350 is greater than the magnitude of the current supplied to the battery 350, the battery 350 may be discharged.

In an embodiment, the charger circuitry 320 may refer to a charge integrated circuit (charge IC) and/or a charging module for controlling charging. The charger circuitry 320 may be disposed between the battery 350 and at least one hardware component electrically connected to the charger circuitry 320, and control the flow of power outputted from the battery 350 and/or power supplied toward the battery 350. Controlling the flow of power may include an operation of adjusting the magnitude of power (for example, current and/or voltage) and/or an operation of cutting off the power (for example, the current and/or the voltage).

In an embodiment, the electronic device 101 may receive power from the external power supply 360 by using the first interface 330 (e.g., the wired charging interface 102 and/or the wireless charging antenna 331). In one example, the charger circuitry 320 may receive the power from the external power supply 360 by using the first interface 330. By using the power supplied from the external power supply 360, the charger circuitry 320 may charge the battery 350 of the electronic device 101 and/or the external electronic device 200 connected through the second interface 340.

In an embodiment, the charger circuitry 320 can determine a charging type (e.g., normal charging or fast charging) of the external power supply 360 based on various factors such as the type (e.g., TA, universal serial bus (USB), power supply, or wireless charging) of the external power supply 360, the magnitude (e.g., about 20 W or more) of power suppliable from the external power supply 360, or the properties of a battery (e.g., the battery 350 of the electronic device 101 and/or the battery 221 of the external electronic device 200). For example, when the charging type of the external power supply 360 is fast charging, the magnitude of supplied power may be larger than that of normal charging. By using the power supplied from the external power supply 360, the electronic device 101 may charge the battery 350 of the electronic device 101 and/or the battery 221 of the external electronic device 200 connected through the second interface 340.

Table 1 shows the charging voltage, the charging current, and the maximum charging current of the charging types of the external power supply 360 in an embodiment.

TABLE 1

| charging type | charging power (W) | charging voltage (V) | charging current (A) | maximum charging current (A) |
|---|---|---|---|---|
| normal charging | 10 W | 5 V | 2 A | 2.1 A |
| fast charging | 15 W | 9 V | 1.67 A | 3.2 A |

Referring to Table 1, when the power suppliable from the external power supply 360 is less than or equal to a specified power (e.g., about 10 W), the charger circuitry 320 may determine the charging type of the external power supply 360 as the normal charging type. The charging voltage supplied from the external power supply 360 to the electronic device 101 may be about 5V, and the charging current may be about 2 A. In the case of the normal charging type, the maximum suppliable current may be about 2.1 A.

In an embodiment, when the power suppliable from the external power supply 360 is equal to or greater than a specified power (e.g., about 15 W), the charger circuitry 320 may determine the charging type of the external power supply 360 as the fast charging type. The charging voltage supplied from the external power supply 360 to the electronic device 101 may be about 9V, and the charging current may be about 1.67 A. In the case of the fast charging type, the maximum suppliable current may be about 3.2 A.

In an embodiment, the external power supply 360 can be connected via a wire, or be connected wirelessly, to the electronic device 101 through the first interface 330.

In an embodiment, when the external power supply 360 is connected to the electronic device 101 through the wired charging interface 102, the charger circuitry 320 may forward power supplied from the external power supply 360, to the battery 350 and/or the external electronic device 200 connected through the second interface 340. In this case, the battery 350 and/or the external electronic device 200 may be charged by the power supplied from the external power supply 360 via a wire.

In an embodiment, when the user arranges an antenna (e.g. wireless charging coil) of a wireless power supply device in the vicinity of the wireless charging antenna 331, the charger circuitry 320 may forward power supplied from the external power supply 360 through the wireless charging antenna 331, to the battery 350 and/or the external electronic device 200 connected through the second interface 340. In this case, the battery 350 and/or the external electronic device 200 may be charged by the power supplied from the external power supply 360 via wireless charging.

In an embodiment, when the electronic device 101 is not connected to the external power supply 360 through the first interface 330, the charger circuitry 320 may forward power outputted from the battery 350, to the external electronic device 200 through the second interface 340. In this case, the battery (e.g., the battery 221 of FIG. 2) of the external electronic device 200 may be charged by the power outputted from the battery 350.

In an embodiment, the charger circuitry 320 may control the magnitude of power supplied to the battery 350 and the magnitude of power outputted from the battery 350. Based on the controlled power magnitudes, the charger circuitry 320 may determine whether the battery 350 is being charged or is being discharged. In one example, the charger circuitry 320 may control the magnitude of power supplied to the battery 221 of the external electronic device 200 connected through the second interface 340.

In an embodiment, the charger circuitry 320 may control the magnitude of power supplied to the battery 350 and the magnitude of power supplied to the external electronic device 200, based on the charging type of the external power supply 360, battery state information of the electronic device 101, state information of the external electronic device 200, and/or information on a previously specified function that will be executed.

In an embodiment, the charger circuitry 320 may control the magnitude of power supplied to the battery 350 and the magnitude of power supplied to the external electronic device 200, such that a function that will be executed by the electronic device 101 and a function that will be executed by the external electronic device 200 may be executed during the same time period.

In an embodiment, the electronic device 101 may communicate with the external electronic device 200 through the second interface 340. For example, the electronic device 101 may perform power line communication (PLC) with the external electronic device 200 through the second interface 340. In an embodiment, the electronic device 101 may receive state information of the external electronic device 200 through the second interface 340. For example, the state information of the external electronic device 200 may include information on the battery (e.g., the batteries 221-L and 221-R of FIG. 2) capacity of the external electronic device 200, a battery state (SoC), and/or remaining amount of power in the battery.

In an embodiment, the state information of the battery 350 may include a state of charge (SoC) of the battery 350, a battery capacity, or a combination thereof. The state information of the battery 350 may include information on the remaining amount of the battery 350. At least one piece of information related to the battery 350 may be related to a condition for charging the battery 350. Descriptions of the battery 350 below may also be applied to the battery (e.g., the battery 221 of FIG. 2) of the external electronic device 200.

In an embodiment, current supplied to the battery 350 (e.g., charging current used for charging the battery 350) may be expressed in various ways by using units such as A or mA. Alternatively, the charging current may be expressed as C-rate. The C-rate indicates a characteristic related to a charge/discharge rate of a current dependent on battery capacity, and the unit of [C] is generally used. For example, when the battery capacity corresponding to current usable for one hour is 1,000 mAh and the charge/discharge current is 1 A, the C-rate is 1 C=1 A/1,000 mAh.

In an embodiment, the charging voltage of the battery 350 (e.g., charging voltage used for charging the battery 350) may be variously expressed using units such as V or mV.

In an embodiment, the charging power of the battery 350 (e.g., power used for charging the battery 350) may be expressed using units such as W or mW, which is the product of the current and voltage used for charging the battery 350.

In an embodiment, the state of charge (SoC) of the battery 350 may be a parameter indicating to what extent the battery 350 has been charged. The SoC represents a level of energy stored in the battery 350 and may be expressed as a value between 0 and 100%. For example, 0% may correspond to the fully discharged state, and 100% may correspond to the fully charged state. The SoC may be variously modified and defined according to design intention or embodiment. The charger circuitry 320 may estimate or measure the SoC based on various techniques. For example, the charger circuitry 320 may determine the SoC, based on the voltage between positive and negative poles of the battery 350 and/or the open circuit voltage (OCV) of the battery 350.

In an embodiment, the capacity of the battery 350 may be expressed in the unit of [Ah] indicating the amount of time that the battery 350 is capable of outputting a current of a specified magnitude, or the current amount that the battery 350 is capable of outputting for one hour. For example, when the capacity of the battery 350 is 5,000 mAh, the battery 350 may output a current of 5,000 mA for one hour. Also, the capacity of the battery 350 may be expressed in the unit of [Wh] which is the product of the charging voltage [V] and the current amount [Ah] indicating the amount of time that the battery 350 is capable of outputting a current of a specified magnitude. For example, when the current amount is 5,000 mAh and the charging voltage is 5V, the capacity of the battery 350 is 25 Wh, and the battery 350 may output power of about 25 W for about one hour.

In an embodiment, information on the state of the external electronic device 200 may include state information of the battery (e.g., the batteries 221-L and 221-R of FIG. 2) of the external electronic device 200.

In an embodiment, a previously specified function that will be executed may include a function that will be executed by the electronic device 101 during charging and/or after charging and a function that will be executed by the external electronic device 200.

In an embodiment, information on the previously specified function that will be executed may be information on the function that will be executed by the electronic device 101, information on the function that will be executed by the external electronic device 200, or a combination thereof.

In an embodiment, the function that will be executed by the electronic device 101 may include a function of charging the external electronic device 200, a controller function of the external electronic device 200, and/or an auxiliary computing device function of the external electronic device 200 (e.g., a computation or data processing and/or space recognition function to control one or more of the components of the external electronic device 200).

In an embodiment, the function that will be executed by the external electronic device 200 may include a function of outputting basic information to a display (e.g., the first display 203-L or the second display 203-R of FIG. 2) and/or an AR function performed using a camera (e.g., the first cameras 205-L and 205-R, the second cameras 207-L and 207-R, and/or the third camera 209 of FIG. 2).

Figure 4A:
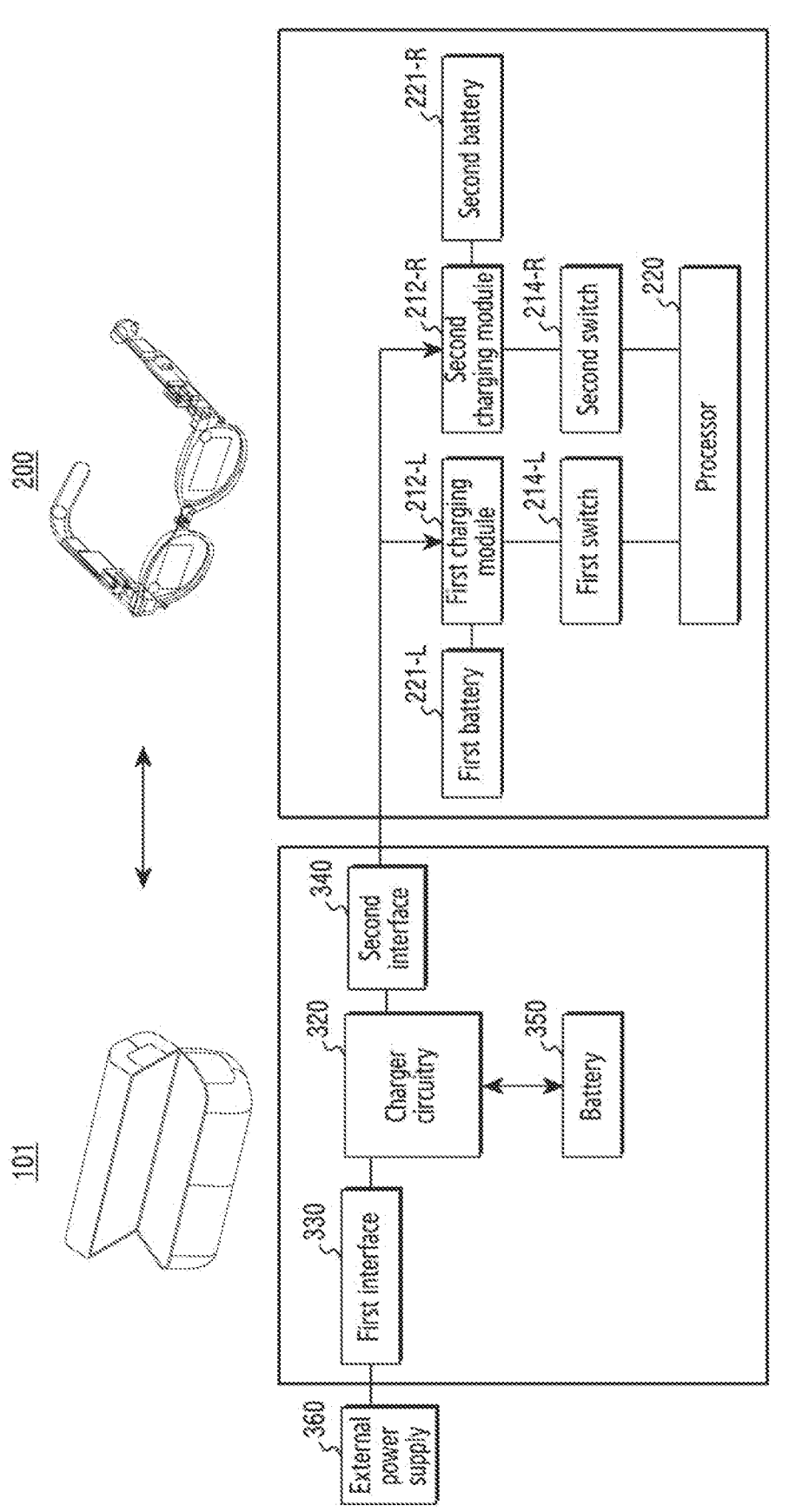
FIG. 4A is a diagram illustrating a charging structure of an electronic device and an external electronic device according to an embodiment.
Figure 4B:
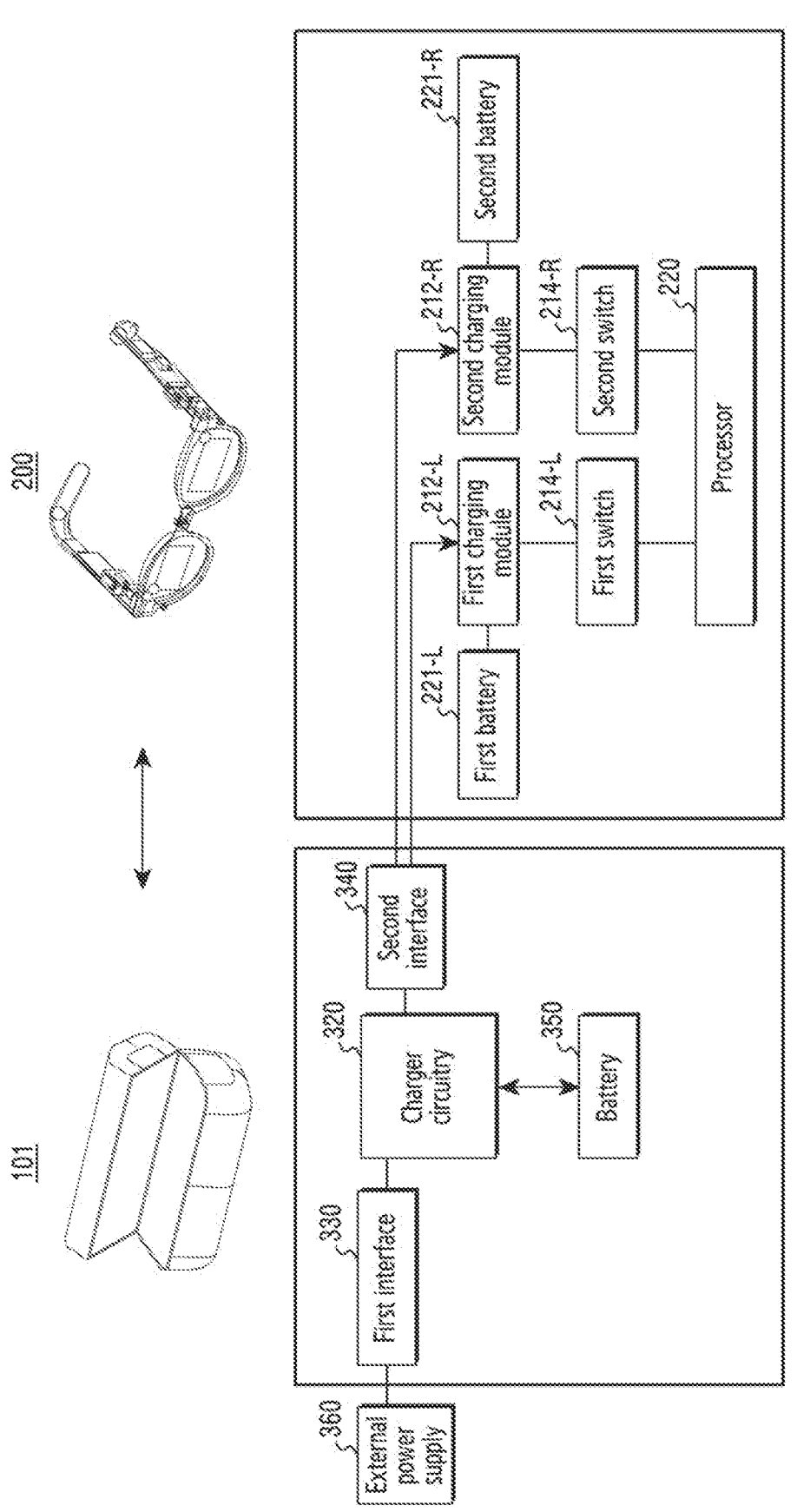
FIG. 4B is a diagram illustrating a charging structure of an electronic device and an external electronic device according to another embodiment.

FIG. 4A is a diagram illustrating a charging structure of the electronic device 101 and the external electronic device 200 according to an embodiment, and FIG. 4B is a diagram illustrating a charging structure of the electronic device 101 and the external electronic device 200 according to another embodiment.

Referring to FIG. 4A, the external electronic device 200 may receive power from the second interface 340 of the electronic device 101 through the first charging module 212-L and the second charging module 212-R. In one example, when the external power supply 360 is connected to the electronic device 101 through the first interface 330, the electronic device 101 may receive power from the external power supply 360. In one example, the electronic device 101 can forward the power supplied from the external power supply 360, to the batteries 221-L and 221-R of the external electronic device 200 which is electrically connected to the battery 350 through the charger circuitry 320 by the second interface 340. The batteries 221-L and 221-R of the external electronic device 200 may be charged based on the power supplied from the electronic device 101.

Referring to FIG. 4A, the external electronic device 200 may include the first charging module 212-L, the second charging module 212-R, the first switch 214-L, the second switch 214-R, the first battery 221-L, the second battery 221-R, and the processor 220.

In an embodiment, the first charging module 212-L and/or the second charging module 212-R may be disposed on the PCB (e.g., the first PCB 211-L and/or the second PCB 211-R of FIG. 2) of the external electronic device 200. The first charging module 212-L may charge the first battery 221-L by using the power that is supplied from the electronic device 101 through the second interface 340. The second charging module 212-R may charge the second battery 221-R by using the power that is supplied from the electronic device 101 through the second interface 340. In one example, the external electronic device 200 may be connected to the electronic device 101 via a wire through a connection terminal (e.g., a wired interface) disposed in the external electronic device 200, or may be connected wirelessly through an antenna module (not shown) disposed in the external electronic device 200. In one example, the external electronic device 200 may be connected to and receive power from the electronic device 101 through wired connection and/or wireless connection. In one example, the first charging module 212-L and/or the second charging module 212-R may be electrically connected to the connection terminal and/or the antenna module and charge the first battery 221-L and/or the second battery 221-R by using the power supplied from the electronic device 101.

In an embodiment, the first switch 214-L may be electrically connected to the first charging module 212-L. The second switch 214-R may be electrically connected to the second charging module 212-R. The power outputted from the first battery 221-L may be forwarded to the first switch 214-L through the first charging module 212-L. The power outputted from the second battery 221-R may be forwarded to the second switch 214-R through the second charging module 212-R. By adjusting the voltage level or current level of power supplied from the batteries 221-L and 221-R, the first switch 214-L and the second switch 214-R may provide a plurality of powers having different voltage levels or different current levels. The voltage level or current level may be adjusted to the voltage level or current level suitable to at least some of the components included in the external electronic device 200.

Referring to FIG. 4A, the charger circuitry 320 may receive power from the external power supply 360 through the first interface 330. In one example, the charger circuitry 320 may determine a first power that will be supplied to the battery 350 and a second power that will be supplied to the external electronic device 200, based on the charging type of the external power supply 360, state information of the battery 350 of the electronic device 101, state information (e.g., state information and/or operation state information of the batteries 221-L and 221-R) of the external electronic device 200, and information on a previously specified function that will be executed. The charger circuitry 320 may charge the battery 350 based on the first power. The charger circuitry 320 may forward the second power to the external electronic device 200 through the second interface 340. In this case, the first battery 221-L and the second battery 221-R of the external electronic device 200 may be charged by the second power supplied from the electronic device 101. In one example, the first charging module 212-L may charge the first battery 221-L based on the second power. The second charging module 212-R may charge the second battery 221-R based on the second power.

In an embodiment, the first charging module 212-L and the second charging module 212-R of the external electronic device 200 may be configured as a single component. For example, one charging module may receive the second power from the second interface 340 of the electronic device 101, and distribute the second power to the first battery 221-L, the second battery 221-R, the first switch 214-L, and/or the second switch 214-R, based on the state of the first battery 221-L, the state of the second battery 221-R, and/or operation state information of the external electronic device 200.

In an embodiment, the charger circuitry 320 may determine a third power that will be supplied to the first battery 221-L and a fourth power that will be supplied to the second battery 221-R, based on the second power, state information of the first battery 221-L, state information of the second battery 221-R, and a function that will be executed by the external electronic device 200.

Referring to FIG. 4B, the charger circuitry 320 may transmit the third power and the fourth power, as different inputs, to the external electronic device 200 through the second interface 340. The charger circuitry 320 may forward the third power to the first charging module 212-L through the second interface 340. The charger circuitry 320 may forward the fourth power to the second charging module 212-R through the second interface 340. The first charging module 212-L may charge the first battery 221-L by using the third power that is supplied from the electronic device 101 through the second interface 340. The second charging module 212-R may charge the second battery 221-R by using the fourth power that is supplied from the electronic device 101 through the second interface 340.

In an embodiment, when the electronic device 101 is not connected to the external power supply 360 through the first interface 330, the charger circuitry 320 may transmit power outputted from the battery 350 of the electronic device 101, to the external electronic device 200 through the second interface 340. In this case, the battery 221 of the external electronic device 200 may be charged by the power outputted from the battery 350.

Figure 6:
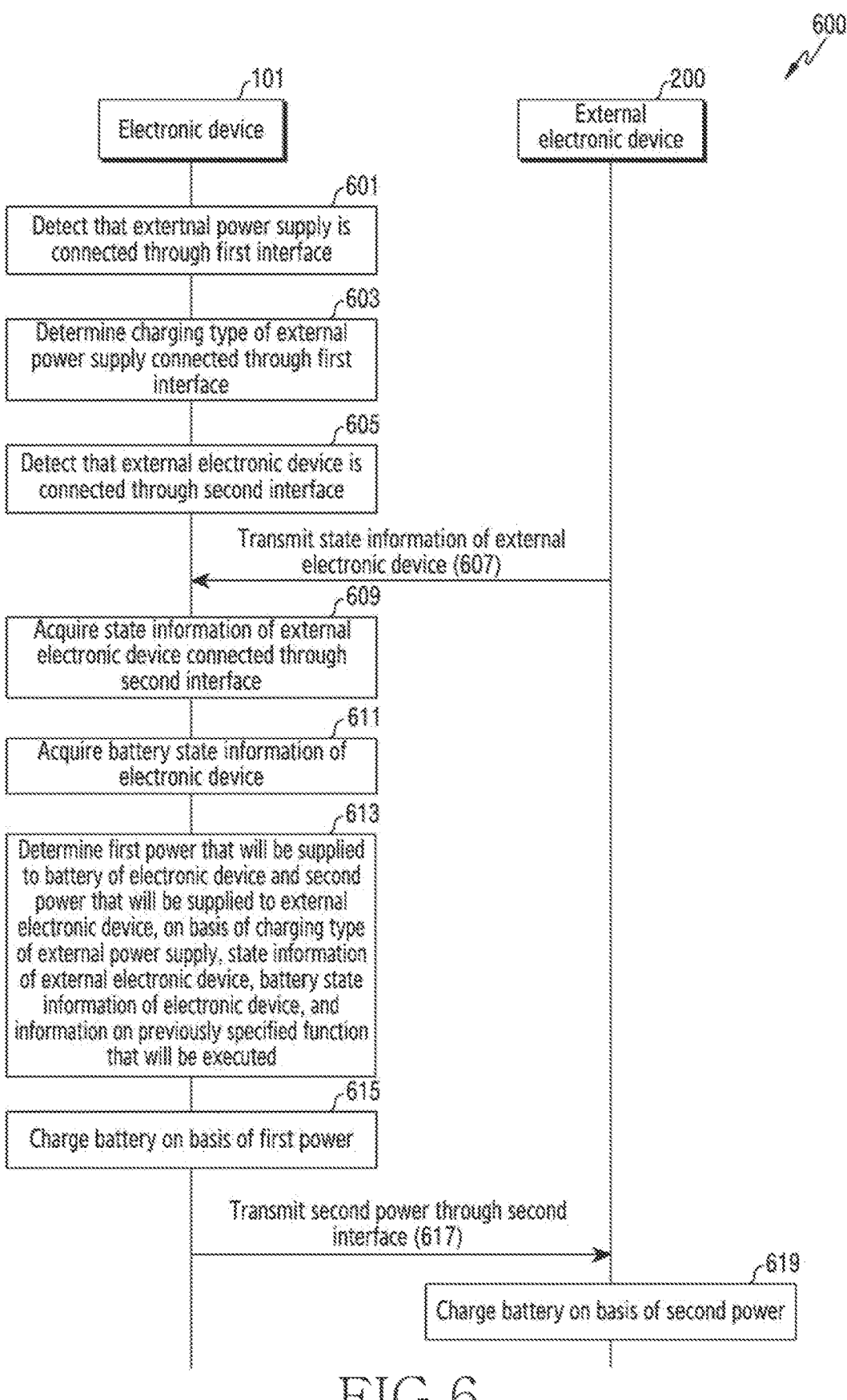
FIG. 6 is an operation flowchart of an electronic device and an external electronic device illustrating a method for controlling the charging of the electronic device and the external electronic device according to an embodiment.

In an embodiment, an operation in which the charger circuitry 320 determines the first power that will be supplied to the battery 350 and the second power that will be supplied to the external electronic device 200 based on the charging type of the external power supply 360, the battery state information of the electronic device 101, the state information of the external electronic device 200, or the information on the previously specified function that will be executed will be described in detail with reference to FIG. 6.

Figure 5:
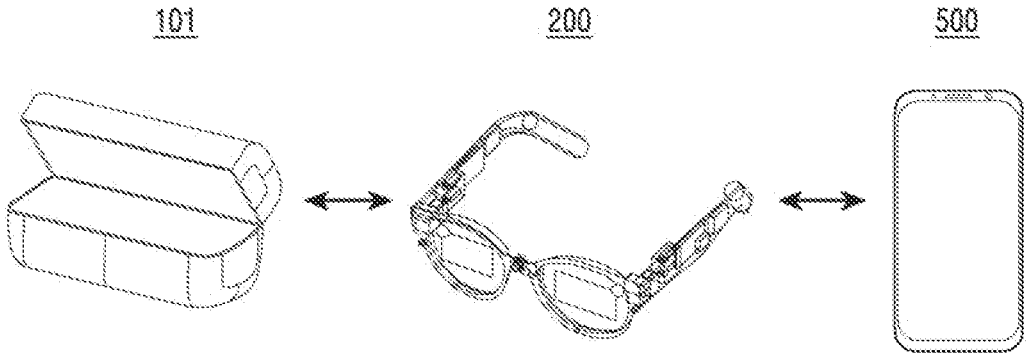
FIG. 5 is a diagram illustrating a connection relationship between an electronic device, an external electronic device, and a user device according to an embodiment.

FIG. 5 is a diagram illustrating a connection relationship between the electronic device 101, the external electronic device 200, and a user device 500 according to an embodiment.

Referring to FIG. 5, the external electronic device 200 may be connected to the electronic device 101 and/or the user device 500 through a network. The network may be suitably selected for the external electronic device 200 to establish a connection with the electronic device 101 and/or the user device 500. For example, the external electronic device 200 may be connected to the electronic device 101 and/or the user device 500 by using Bluetooth, Bluetooth low energy (BLE), Wi-Fi direct, near field communication (NFC), ultra-wide band (UWB) communication, and/or infrared communication.

In an embodiment, the electronic device 101 may be a case-type electronic device for safekeeping and/or charging the external electronic device 200. For example, when the external electronic device 200 is smart glasses, the electronic device 101 may be a smart glasses case.

According to an embodiment, the user device 500 may include some or all of components constructing an electronic device 1001 of FIG. 10. In one example, the user device 500 may be a smart phone, a smart pad, a tablet PC, a laptop PC, a desktop PC, etc.

In an embodiment, the user device 500 may include a station or home server for presenting virtual reality (VR), augmented reality (AR) or mixed reality (MR) services, or any electronic device having suitable processing capability.

In an embodiment, the external electronic device 200 may be accommodated in the electronic device 101. In this case, the external electronic device 200 may be electrically connected to the electronic device 101 through the second interface 340. The electronic device 101 may charge the external electronic device 200 by using power that is supplied from the external power supply 360 through the first interface 330.

In an embodiment, some of functions of the external electronic device 200 may be executed by the electronic device 101. In one example, the electronic device 101 may function as a controller of the external electronic device 200. For example, the electronic device 101 may control the overall operation of the external electronic device 200. The electronic device 101 may be wirelessly connected to the external electronic device 200 or connected to the external electronic device 200 via a wire in order to control each element of the external electronic device 200.

In an embodiment, some of functions of the user device 500 may be executed by the electronic device 101. In one example, the electronic device 101 may function as an auxiliary computing device of the external electronic device 200. For example, the electronic device 101 may determine virtual and/or augmented reality contents for a real object, which is in sight of the user who wears the external electronic device 200, and whose image is obtained through a camera (e.g., the first cameras 205-L and 205-R, the second cameras 207-L and 207-R, and/or the third camera 209 of FIG. 2) of the external electronic device 200. Also, the electronic device 101 may render, on a separate display, the real object whose image is obtained through the camera (e.g., the first cameras 205-L and 205-R, the second cameras 207-L and 207-R, and/or the third camera 209 of FIG. 2) of the external electronic device 200.

FIG. 6 is an operation flowchart 600 of the electronic device 101 and the external electronic device 200 illustrating a method for controlling the charging of the electronic device 101 and the external electronic device 200 according to an embodiment.

In the following embodiment, some operations may be shown to be performed sequentially, but this is not necessarily the case. For example, the order of respective some operations may be changed as well, and at least two operations may be performed in parallel.

According to an embodiment, in operation 601, the electronic device 101 (e.g., the processor 310 of FIG. 3) may detect that an external power supply (e.g., the external power supply 360 of FIG. 3) is connected through the first interface 330.

In an embodiment, the first interface 330 may include the wired charging interface 102 and the wireless charging antenna 331. The charger circuitry 320 may receive power from the external power supply 360 by using the first interface 330.

According to an embodiment, in operation 603, the electronic device 101 (e.g., the processor 310 of FIG. 3) may determine information on the charging type of the external power supply 360 connected through the first interface 330.

In an embodiment, the charging type of the external power supply 360 can be determined based on factors such as information on the type (e.g., TA, USB, power supply or wireless charging) of the external power supply 360, the magnitude of power supplied from the external power supply 360, or the properties of a battery (e.g., the battery 350 of the electronic device 101 and/or the battery 221 of the external electronic device 200). For example, when the processor 310 supports wireless charging function (e.g., adaptive fast charging (AFC) technology) and power suppliable from the external power supply 360 is greater than or equal to a specified power (e.g., about 15 W), the processor 310 may determine the charging type of the external power supply 360 as the fast charging type. In one example, when the charging type of the external power supply 360 is the fast charging type, the charging voltage and/or charging current may be higher than that of the normal charging type.

According to an embodiment, in operation 605, the electronic device 101 (e.g., the processor 310 of FIG. 3) may detect that the external electronic device 200 is connected through the second interface 340. In another embodiment, operation 605 may be omitted. For example, when a device not supporting power reception is connected, it is possible to detect that the device is connected through the second interface 340 but, because the device cannot receive power, the operation in which the electronic device 101 transmits power to the device cannot be performed. Accordingly, an operation in which the electronic device 101 detects that the external electronic device 200 is connected through the second interface 340 and determines whether the external electronic device 200 may receive power may precede an operation (operation 607) in which the external electronic device 200 transmits state information of the external electronic device 200 to the electronic device 101. However, in one example, the electronic device 101 may acquire the state information of the external electronic device 200 irrespective of whether the external electronic device 200 connected to the second interface 340 supports power reception. In this case, operation 605 may be omitted.

According to an embodiment, in operation 607, the external electronic device 200 may transmit the state information of the external electronic device 200 to the electronic device 101.

According to an embodiment, the electronic device 101 may receive the state information of the external electronic device 200 from the external electronic device 200.

In an embodiment, the external electronic device 200 may transmit the state information of the external electronic device 200 to the electronic device 101. In one example, the external electronic device 200 may transmit the state information of the external electronic device 200 to the electronic device 101 through a wireless communication module. In another example, the external electronic device 200 may transmit the state information of the external electronic device 200 to the electronic device 101 through power line communication (PLC). In one example, the external electronic device 200 may transmit the state information of the external electronic device 200 to the electronic device 101 through a wireless communication module or a connection terminal (e.g., a wired interface).

According to an embodiment, in operation 609, the electronic device 101 (e.g., the processor 310 of FIG. 3) may acquire the state information of the external electronic device 200 connected through the second interface 340.

In an embodiment, the state information of the external electronic device 200 may include state information of the battery 221 of the external electronic device 200. The state information of the battery 221 of the external electronic device 200 may include the capacity of the battery 221 when fully charged, and/or the state of charge (SoC) of the battery 221 of the external electronic device 200. The state information of the battery 221 of the external electronic device 200 may include information on the remaining amount of power of the battery 221.

According to an embodiment, in operation 611, the electronic device 101 (e.g., the processor 310 of FIG. 3) may obtain battery state information of the electronic device 101. In one example, the battery state information of the electronic device 101 may include the capacity of the battery 350 and/or the charging state of the battery 350. The battery state information of the electronic device 101 may include information on the remaining amount of power of the battery 350.

According to an embodiment, in operation 613, the electronic device 101 (e.g., the processor 310 of FIG. 3) may determine first power that will be supplied to the battery 350 of the electronic device 101 and second power that will be supplied to the external electronic device 200, based on the charging type of the external power supply 360, the state information of the external electronic device 200, the battery state information of the electronic device 101, and the information on the previously specified function that will be executed.

In an embodiment, the processor 310 may determine the first power that will be supplied to the battery 350 of the electronic device 101 and the second power that will be supplied to the external electronic device 200 such that the electronic device 101 and the external electronic device 200 may be used during the same time period after charging.

In an embodiment, the memory 312 of the electronic device 101 may store information on a function that will be executed among previously specified functions. In one example, the previously specified function that will be executed may include a function that will be executed by the electronic device 101 and a function that will be executed by the external electronic device 200.

In an embodiment, the information on the previously specified function that will be executed may be acquired based on a user input. For example, prior to operation 613, a user may input the information on the function that will be executed, through an input/output device (e.g., a touch screen, a keyboard communication module or a sensor) of the electronic device 101. In another embodiment, the information on the previously specified function that will be executed may be acquired based on information on a function executed by the electronic device 101 before the charging of the electronic device 101 and the external electronic device 200 and/or a function executed by the external electronic device 200, stored in the memory 312. In one example, information on the function that will be executed by the electronic device 101 among the previously specified functions that will be executed may be acquired based on a user input. Information on the function that will be executed by the external electronic device 200 among the previously specified functions that will be executed may be acquired based on a record of the functions executed by the external electronic device 200 before charging.

In an embodiment, an operation in which the charger circuitry 320 acquires, based on a user input, the information on the function that will be executed among the previously specified functions will be described in detail with reference to FIG. 8A to FIG. 8C.

In an embodiment, the function that will be executed by the external electronic device 200 may include a function of displaying general contents that is not virtual and/or augmented reality on the first display 203-L and/or the second display 203-R of the external electronic device 200. Below, the function in which the external electronic device 200 outputs general contents to the first display 203-L or the second display 203-R may be referred to as a function A (e.g., an info function). For example, the general contents may mean contents not corresponding to image or video including a virtual reality (or an augmented reality) object that is based on an image and/or video acquired using a camera (e.g., the first cameras 205-L and 205-R, the second cameras 207-L and 207-R, and the third camera 209 of FIG. 2) of the external electronic device 200. The general contents may mean contents corresponding to an image and/or video which is received from a server, an external device and/or the light output module 201 without using the camera (e.g., the first cameras 205-L and 205-R, the second cameras 207-L and 207-R, and the third camera 209 of FIG. 2) and outputted through the display 203.

In an embodiment, the function that will be executed by the external electronic device 200 may include functions the external electronic device 200 performs using the camera (e.g., the first cameras 205-L and 205-R, the second cameras 207-L and 207-R, and/or the third camera 209 of FIG. 2). Hereinafter, the functions the external electronic device 200 performs using the camera may be referred to as a function B (e.g., a vision function).

In an embodiment, the function that will be executed by the electronic device 101 may include a function of charging the external electronic device 200. In one example, the electronic device 101 may forward at least one portion of power supplied from the external power supply 360, to the external electronic device 200 connected through the second interface 340. Hereinafter, the function in which the electronic device 101 charges the external electronic device 200 by using the power supplied from the external power supply 360 may be referred to as a function C (e.g., a charging function).

In an embodiment, the function that will be executed by the electronic device 101 may include a function in which the electronic device 101 controls an overall operation of the external electronic device 200. The electronic device 101 may control each element of the external electronic device 200. Hereinafter, the function of controlling the overall operation of the external electronic device 200 together with the function in which the electronic device 101 charges the external electronic device 200 may be referred to as a function D (e.g., a controller function).

In an embodiment, the electronic device 101 may determine virtual and/or augmented reality contents for a real object, which is in sight of a user wearing the external electronic device 200, whose image is obtained through a camera (e.g., the first cameras 205-L and 205-R, the second cameras 207-L and 207-R and/or the third camera 209 of FIG. 2) of the external electronic device 200. Also, the electronic device 101 may render, as a 3D model, the real object whose image is obtained through the camera (e.g., the first cameras 205-L and 205-R, the second cameras 207-L and 207-R and/or the third camera 209 of FIG. 2) of the external electronic device 200. Hereinafter, the function of determining the virtual and/or augmented reality contents and rendering the obtained real object as the 3D model together with the function in which in which the electronic device 101 charges the external electronic device 200 may be referred to as a function E (e.g., an auxiliary computing device function).

In an embodiment, the consumed power of the electronic device 101 may vary according to the function that will be executed by the electronic device 101. The consumed power of the external electronic device 200 may vary according to the function that will be executed by the external electronic device 200. For example, the function C (e.g., the charging function) that will be executed by the electronic device 101 is a function that consumes low power (e.g., about 0.01 W), and the function E (e.g., the auxiliary computing device function) that will be executed by the electronic device 101 may be a function that consumes high power (e.g., about 5 W).

An operation in which the electronic device 101 (e.g., the charger circuitry 320 and/or the processor 310) controls the first power that will be supplied to the battery 350 of the electronic device 101 and the second power that will be supplied to the external electronic device 200 will be described below in detail.

In an embodiment, the electronic device 101 (e.g., the processor 310 of FIG. 3) may determine an expected use time of the electronic device 101 and the expected use time of the external electronic device 200, based on the previously specified function that will be executed, state information of the external electronic device 200, and state information on the battery 350.

In an embodiment, the expected use time of the electronic device 101 may refer to the time period until the battery 350 is fully discharged, when the function that will be executed by the electronic device 101 among the previously specified function that will be executed is performed, based on information on the remaining amount of the battery 350 before charging.

In an embodiment, the expected use time of the external electronic device 200 may refer to the time period until the battery 221 is fully discharged, when the function that will be executed by the external electronic device 200 among the previously specified function that will be executed is performed, based on information on the remaining amount of the battery 221 before charging.

In an embodiment, the external electronic device 200 may include a plurality of batteries (e.g., the first battery 221-L and the second battery 221-R). For example, the expected use time of the external electronic device 200 may be an average of expected use time of the plurality of batteries. In another embodiment, the expected use time of the external electronic device 200 may be the expected use time of the battery with the smaller remaining amount among the plurality of batteries.

$$\text{expected use time of electronic device } [Hr] = \quad \text{[Equation 1]}$$
$$\frac{\text{remnant amount of}}{\text{battery of electronic device } [Wh]}{\text{consumed power of electronic device } [W]}$$

Referring to Equation 1, the expected use time (unit: [Hr]) of the electronic device 101 may correspond to a value dividing the remaining amount (unit: [Wh]) of the battery 350 of the electronic device 101 by a consumed power (unit: [W]) of the electronic device 101.

In an embodiment, the battery state information of the electronic device 101 obtained in operation 611 may include information on the remaining amount of the battery 350.

In an embodiment, the consumed power of the electronic device 101 may be the magnitude of power to be consumed by the function that will be executed by the electronic device 101 among the previously specified functions.

In an embodiment, the processor 310 may acquire information on the expected use time of the electronic device 101 through Equation 1, based on the information on the previously specified function that will be executed and the remaining amount of the battery 350 of the electronic device 101.

$$\text{expected use time of external electronic device } [Hr] = \quad \text{[Equation 2]}$$
$$\frac{\text{remnant amount of battery of external electronic device } [Wh]}{\text{consumed power of external electronic device } [W]}$$

Referring to Equation 2, the expected use time (unit: [Hr]) of the external electronic device 200 may correspond to a value dividing the remaining amount (unit: [Wh]) of the battery 221 of the external electronic device 200 by the consumed power (unit: [W]) of the external electronic device 200.

In an embodiment, the state information of the external electronic device 200 acquired in operation 609 may include information on the remaining amount of the battery 221 of the external electronic device 200.

In an embodiment, the consumed power of the external electronic device 200 may refer to the power to be consumed by the function that will be executed by the external electronic device 200 among the previously specified functions.

In an embodiment, the processor 310 may acquire information on the expected use time of the external electronic device 200 through Equation 2, based on the information on the previously specified function that will be executed and the remaining amount of the battery 221 of the external electronic device 200.

In an embodiment, the electronic device 101 (e.g., the processor 310 of FIG. 3) may determine a weight of the electronic device 101 and a weight of the external electronic device 200, based on the previously specified function that will be executed, the expected use time of the electronic device 101 acquired through Equation 1, and/or the expected use time of the external electronic device 200 acquired through Equation 2.

In an embodiment, the weight of the electronic device 101 may be a parameter for controlling the first power that will be supplied to the battery 350 of the electronic device 101 such that the function that will be executed by the electronic device 101 and the function that will be executed by the external electronic device 200 will be executed may be executed during the same time period after charging.

In an embodiment, the weight of the external electronic device 200 may be a parameter for controlling the second power that will be supplied to the external electronic device 200 such that the function that will be executed by the electronic device 101 and the function that will be executed by the external electronic device 200 will be executed may be executed during the same time period after charging.

$$\text{weight of electronic device} = \frac{\text{consumed power of electronic device } [W]}{\begin{array}{c}\text{consumed power of electronic device } [W] + \\ \text{consumed power of external electronic device } [W]\end{array}} \times \qquad \text{[Equation 3]}$$

$$\frac{\text{expected use time of external electronic device } [Hr]}{\begin{array}{c}\text{expected use time of electronic device } [Hr] + \\ \text{expected use time of external electronic device } [Hr]\end{array}}$$

Referring to Equation 3, the weight of the electronic device 101 may correspond to a value multiplying a ratio of the consumed power of the electronic device 101 to a consumed power of the previously specified function that will be executed, by a ratio of the expected use time of the external electronic device 200 to a value adding the expected use time of the electronic device 101 and the expected use time of the external electronic device 200.

In an embodiment, the previously specified consumed power that will be executed may correspond to a value adding the consumed power of the function that will be executed by the electronic device 101 and the consumed power of the function that will be executed by the external electronic device 200.

In an embodiment, the processor 310 may acquire the weight of the electronic device 101 through Equation 3, based on the expected use time of the electronic device 101 acquired through Equation 1, the expected use time of the external electronic device 200 acquired through Equation 2, and consumed power for the previously specified function that will be executed.

$$\text{weight of external electronic device} = \frac{\text{consumed power of external electronic device } [W]}{\substack{\text{consumed power of electronic device } [W] + \\ \text{consumed power of external electronic device } [W]}} \times \qquad \text{[Equation 4]}$$

$$\frac{\text{expected use time of electronic device } [Hr]}{\substack{\text{expected use time of electronic device } [Hr] + \\ \text{expected use time of external electronic device } [Hr]}}$$

Referring to Equation 4, the weight of the external electronic device 200 may correspond to a value multiplying a ratio of the consumed power of the external electronic device 200 to a consumed power of the previously specified function that will be executed, by a ratio of the expected use time of the electronic device 101 to a value adding the expected use time of the electronic device 101 and the expected use time of the external electronic device 200.

In an embodiment, the electronic device 101 (e.g., the processor 310 of FIG. 3) may determine the first power that will be supplied to the battery 350 and the second power that will be supplied to the external electronic device 200, based on the charging type of the external power supply 360, the weight of the electronic device 101 acquired through Equation 3, and the weight of the external electronic device 200 acquired through Equation 4.

In an embodiment, the processor 310 may acquire the weight of the external electronic device 200 through Equation 4, based on the expected use time of the electronic device 101 acquired through Equation 1, the expected use time of the external electronic device 200 acquired through Equation 2, and the previously specified function that will be executed.

In an embodiment, the power supplied by the external power supply 360 can vary according to the charging type of the external power supply 360. For example, when the charging type of the external power supply 360 is the fast charging type, the power supplied by the external power supply 360 can be greater than that when the charging type of the external power supply 360 is the normal charging type.

$$\text{charging power supplied to battery of electronic device } [W] = \qquad \text{[Equation 5]}$$

$$\frac{\text{weight of electronic device}}{\text{weight of electronic device} + \text{weight of external electronic device}} \times$$

$$\text{power supplied by external power supply } [W]$$

Referring to Equation 5, the first power corresponding to the power supplied to the battery 350 of the electronic device 101 may correspond to a value multiplying a ratio of the weight of the electronic device 101 to a value adding the weight of the electronic device 101 acquired through Equation 4 and the weight of the external electronic device 200 acquired through Equation 5, by the power value supplied by the external power supply 360.

In an embodiment, the ratio of the weight of the electronic device 101 to the value adding the weight of the electronic device 101 and the weight of the external electronic device 200 may correspond to a ratio of power supplied to the battery 350 to power supplied by the external power supply 360.

In an embodiment, the processor 310 can acquire the first power that will be supplied to the battery 350 through Equation 5, based on the weight of the electronic device 101 acquired through Equation 3, the weight of the external electronic device 200 acquired through Equation 4, and the power supplied by the external power supply 360.

[Equation 6]

$$\text{charging power supplied to external electronic device } [W] = \frac{\text{weight of external electronic device}}{\text{weight of electronic device} + \text{weight of external electronic device}} \times \text{power supplied by external power supply } [W]$$

Referring to Equation 6, the second power corresponding to the power that will be supplied to the external electronic device 200 may correspond to a value multiplying a ratio of the weight of the external electronic device 200 to a value adding the weight of the electronic device 101 acquired through Equation 3 and the weight of the external electronic device 200 acquired through Equation 4, by the power value supplied by the external power supply 360.

In an embodiment, the ratio of the weight of the external electronic device 200 to the value adding the weight of the electronic device 101 and the weight of the external electronic device 200 may correspond to a ratio of the power supplied to the external electronic device 200 to the power supplied by the external power supply 360.

In an embodiment, the processor 310 may acquire the second power that will be supplied to the external electronic device 200 through Equation 6, based on the weight of the electronic device 101 acquired through Equation 3, the weight of the external electronic device 200 acquired through Equation 4, and the power supplied by the external power supply 360.

In an embodiment, as the expected use time of the external electronic device 200 is shorter than the expected use time of the electronic device 101, and consumed power of the function performed by the external electronic device 200 is higher, the ratio of power supplied to the external electronic device 200 to power supplied by the external power supply 360 can be high. In this case, the magnitude of the power supplied to the external electronic device 200 may be greater than the magnitude of power supplied to the battery 350 of the electronic device 101.

In an embodiment, the electronic device 101 (e.g., the processor 310) may determine the first power that will be supplied to the battery 350 and the second power that will be supplied to the external electronic device 200 through Equation 1 to Equation 6.

Table 2 shows information related to a function that will be executed by the electronic device 101 and a function that will be executed by the external electronic device 200 in an embodiment.

TABLE 2

| combination of use | setting function | consumed power (W) | usable time when battery is fully charged (hr) | setting function | consumed power (W) | usable time when battery is fully charged (hr) |
|---|---|---|---|---|---|---|
| | when battery capacity of external electronic device 200 is 4.5 Wh | | | when battery capacity of electronic device 101 is 22.5 Wh | | |
| 1 (801) | function A | 1 W | 4.5 hr | function C | 0.1 W | 225 hr |
| 2 (802) | function A | 1 W | 4.5 hr | function D | 3 W | 7.5 hr |
| 3 (803) | function B | 3 W | 1.5 hr | function C | 0.1 W | 225 hr |
| 4 (804) | function B | 3 W | 1.5 hr | function D | 3 W | 7.5 hr |
| 5 (805) | function B | 3 W | 1.5 hr | function E | 5 W | 4.5 hr |

In an embodiment, the previously specified function that will be executed may be constructed as an appropriate combination of a function that will be executed by the electronic device 101 and a function that will be executed by the external electronic device 200. In one example, the previously specified function that will be executed may be constructed as a combination of at least one of functions that will be executed by the electronic device 101 and at least one of functions that will be executed by the external electronic device 200.

In an embodiment, referring to Table 2, the use combination 1 (801 shown in FIG. 8A) may mean a combination of function A (e.g., an info function) that will be executed by the external electronic device 200 and function C (e.g., a charging function) that will be executed by the electronic device 101.

In an embodiment, referring to Table 2, the use combination 3 (803) may mean a combination of function B (e.g., a vision function) that will be executed by the external electronic device 200 and function C (e.g., a charging function) that will be executed by the electronic device 101.

Referring to Table 2, in an embodiment, when the battery 221 of the external electronic device 200 is fully charged, the capacity of the battery 221 may be about 4.5 Wh. That is, the external electronic device 200 may output power of about 4.5 W for about one hour.

Referring to Table 2, in an embodiment, when the battery 350 of the electronic device 101 is fully charged, the capacity of the battery 350 may be about 22.5 Wh. The electronic device 101 may output power of about 22.5 W for about one hour.

In an embodiment, the function A (e.g., the info function) or the function B (e.g., the vision function) may be executed by the external electronic device 200.

In an embodiment, when the function A is executed by the external electronic device 200, consumed power may be about 1 W. When the function A is executed by the external electronic device 200, and the capacity of the battery 221 is about 4.5 Wh, an expected use time of the external electronic device 200 acquired through Equation 2 may be about 4.5 hours.

In an embodiment, when the function B is executed by the external electronic device 200, consumed power may be about 3 W. When the function B is executed by the external electronic device 200, and the capacity of the battery 221 is about 4.5 Wh, the expected use time of the external electronic device 200 acquired through Equation 2 may be about 1.5 hours.

In an embodiment, the function C (e.g., the charging function), the function D (e.g., the controller function) or a function E (e.g., an auxiliary computing device function) may be executed by the electronic device 101.

When the function C is executed by the electronic device 101, the consumed power may be about 0.01 W. When the function C is executed by the electronic device 101, and the capacity of the battery 350 is about 22.5 Wh, the expected use time of the electronic device 101 acquired through Equation 1 may be about 225 hours.

In an embodiment, when the function D is performed by the electronic device 101, the consumed power may be about 3 W. When the function D is performed by the electronic device 101, and a capacity of the battery 350 is about 22.5 Wh, the expected use time of the electronic device 101 acquired through Equation 1 may be about 7.5 hours.

In an embodiment, when the function E is performed by the electronic device 101, the consumed power may be about 5 W. When the function E is performed by the electronic device 101, and the capacity of the battery 350 is about 22.5 Wh, the expected use time of the electronic device 101 acquired through Equation 1 may be about 4.5 hours.

Table 3 shows the first power that will be supplied to the battery 350 of the electronic device 101 and the second power that will be supplied to the external electronic device 200, when the previously specified function that will be executed is the use combination 2 (802) in an embodiment.

TABLE 3

| previously specified function that will be executed - use combination 2 (802) | | | | | | | |
|---|---|---|---|---|---|---|---|
| external electronic device (200) | | electronic device (101) | | | | | |
| battery | | battery | | weight | | | |
| (221) | | (350) | | external | | | |
| remaining | expected | remaining | expected | electronic | electronic | supplied power | |
| amount (Wh) | use time (hr) | amount (Wh) | use time (hr) | device 200 | device 101 | second power | first power |
| embodiment 1 | 2 Wh | 2 hr | 9 Wh | 3 hr | 0.15 | 0.30 | about 0.33 of charging power | about 0.66 of charging power |

Referring to Table 2 and Table 3, in an embodiment, the previously specified function that will be executed may be the use combination 2 (802). The previously specified function that will be executed may be inputted by a user. In one example, the use combination 2 (802) may include the function A that will be executed by the external electronic device 200 and the function D that will be executed by the electronic device 101.

Referring to Table 3, in an embodiment, consumed power of the function A that will be executed by the external electronic device 200 may be about 1 W. In this case, the expected use time of the external electronic device 200 having the remaining amount of the battery 221 of about 2 W acquired through Equation 2 may be about 2 hours.

In an embodiment, consumed power of the function D that will be executed by the electronic device 101 may be about 3 W. In this case, the expected use time of the electronic device 101 having the remaining amount of the battery 350 of about 9 W acquired through Equation 1 may be about 3 hours.

Referring to Table 3, the weight of the external electronic device 200 acquired through Equation 4 may be 0.15, and the weight of the electronic device 101 acquired through Equation 3 may be 0.30. The weight of the electronic device 101 may be higher than the weight of the external electronic device 200. This may mean that the first power that will be supplied to the battery 350 of the electronic device 101 is higher than the second power that will be supplied to the external electronic device 200.

The first power that will be supplied to the battery 350 of the electronic device 101 may be acquired through Equation 5 that utilizes the weight of the electronic device 101 acquired through Equation 3, the weight of the external electronic device 200 acquired through Equation 4, and the power supplied from the external power supply 360.

The second power that will be supplied to the external electronic device 200 may be acquired through Equation 6 that utilizes the weight of the electronic device 101 acquired through Equation 3, the weight of the external electronic device 200 acquired through Equation 4, and the power supplied from the external power supply 360.

Referring to Table 3, the first power that will be supplied to the electronic device 101 may be about 0.33 of the power supplied from the external power supply 360. The second power that will be supplied to the external electronic device 200 may be about 0.66 of the power supplied from the external power supply 360.

In an embodiment, in operation 615, the electronic device 101 (e.g., the processor 310 of FIG. 3) may charge the battery 350, based on the first power. In one example, the processor 310 may charge the battery 350, based on the first power, through the charger circuitry 320. The charger circuitry 320 may charge the battery 350, based on the first power.

In an embodiment, in operation 617, the electronic device 101 (e.g., the processor 310 of FIG. 3) may transmit the second power to the external electronic device 200 through the second interface 340. In one example, the external electronic device 200 may receive the second power from the electronic device 101.

In an embodiment, by using the second power supplied from the electronic device 101, the external electronic device 200 may charge the battery 221 through a charging module (e.g., the first charging module 212-L and the second charging module 212-R of FIG. 4A).

Figure 7:
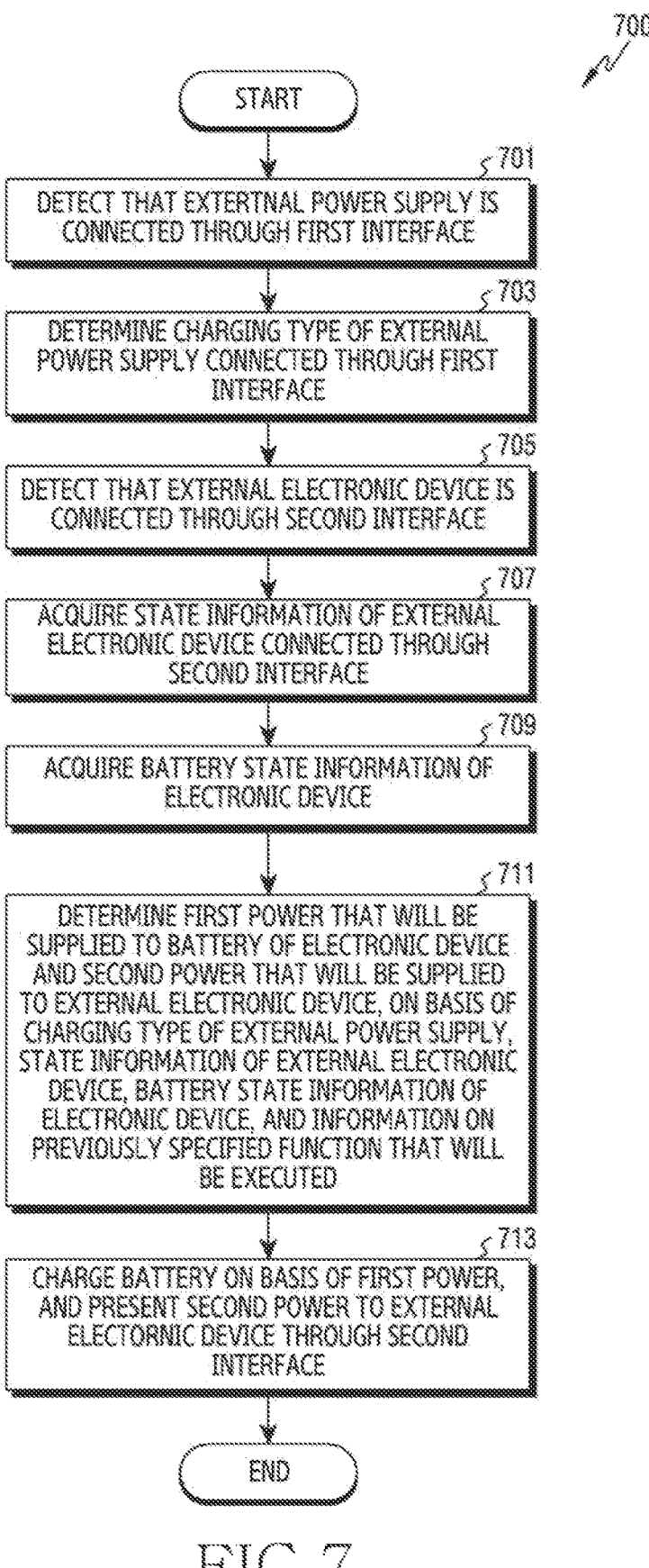
FIG. 7 is a flowchart illustrating a method for controlling the charging of an electronic device and an external electronic device according to an embodiment.

FIG. 7 is a flowchart 700 illustrating a method for controlling the charging of the electronic device 101 and the external electronic device 200 according to an embodiment.

In the following embodiment, some operations may be shown to be performed sequentially, but this is not necessarily the case. For example, at least two operations may be performed in parallel.

According to an embodiment, in operation 701, the electronic device 101 (e.g., the processor 310 of FIG. 3) may detect that the external power supply 360 is connected through the first interface 330.

According to an embodiment, in operation 703, the electronic device 101 (e.g., the processor 310 of FIG. 3) may determine a charging type of the external power supply 360 connected through the first interface 330.

According to an embodiment, in operation 705, the electronic device 101 (e.g., the processor 310 of FIG. 3) may detect that the external electronic device 200 is connected through the second interface 340.

According to an embodiment, in operation 707, the electronic device 101 (e.g., the processor 310 of FIG. 3) may acquire state information of the external electronic device 200 connected through the second interface 340. In one example, the state information of the external electronic device 200 may include information on the state of charge (SoC) of the external electronic device 200. The state information of the external electronic device 200 may include information on the remaining amount of the battery 221 of the external electronic device 200.

According to an embodiment, in operation 709, the electronic device 101 (e.g., the processor 310 of FIG. 3) may acquire battery state information of the electronic device 101. In one example, the battery state information of the electronic device 101 may include information on the battery charge state (SoC) of the electronic device 101. In one example, the battery state information of the electronic device 101 may include information on the remaining amount of the battery 350.

According to an embodiment, operation 705 in which the electronic device 101 detects that the external electronic device 200 is connected through the second interface 340 and the operation 707 of acquiring state information of the external electronic device 200 connected through the second interface 340 may be performed after the operation in which the electronic device 101 acquires battery state information of the electronic device 101. According to another embodiment, the electronic device 101 may charge the external electronic device 200 through the battery 350 of the electronic device 101 when the external power supply 360 is not connected, and may perform operation 701 of detecting that the external power supply 360 is connected through the first interface 330 while charging the external electronic device 200.

According to an embodiment, in operation 711, the electronic device 101 (e.g., the processor 310 of FIG. 3) may determine first power that will be supplied to the battery 350 of the electronic device 101 and second power that will be supplied to the external electronic device 200, based on the charging type of the external power supply 360, the state information of the external electronic device 200, the battery state information of the electronic device 101, and the information on the previously specified function that will be executed.

In an embodiment, the processor 310 may control power that will be supplied to the battery 350 and power that will be supplied to the external electronic device 200 such that the time periods of execution of a function that will be executed by the electronic device 101 and a function that will be executed by the external electronic device 200 are the same after charging.

In an embodiment, the information on the previously specified function that will be executed may be acquired based on a user input to a user interface (UI) displayed on the display 311 of the electronic device 101. In another example, the information on the previously specified function that will be executed may be acquired based on a user input to a UI displayed on the display 203 of the external electronic device 200. In a further example, the information on the previously specified function that will be executed may be acquired based on a user input to a UI displayed on a display of a user device (e.g., the user device 500 of FIG. 5).

In an embodiment, the processor 310 may determine first power supplied to the battery 350 and second power supplied to the external electronic device 200, based on the previously specified function that will be executed, information on the remaining amount of the battery 350 of the electronic device 101, and information on the remaining amount of the battery 221 of the external electronic device 200.

According to an embodiment, in operation 713, the electronic device 101 (e.g., the processor 310 of FIG. 3) may charge the battery 350 based on the first power, and present the second power to the external electronic device 200 through the second interface 340.

Figure 8A:
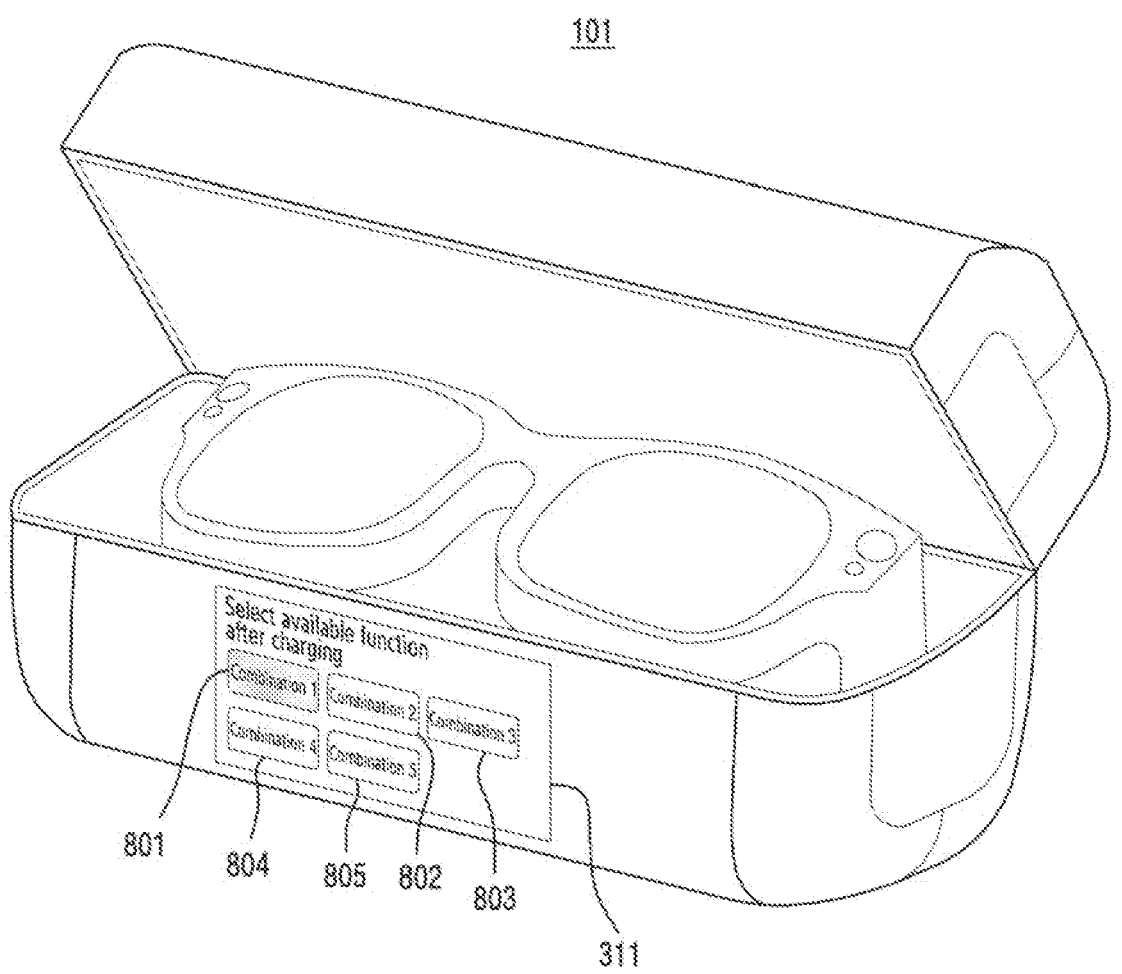
FIG. 8A is a diagram illustrating a user interface (UI) displayed on a display of an electronic device in order to acquire information on a previously specified function that will be executed according to an embodiment.

FIG. 8A is a diagram illustrating a UI displayed on the display 311 of the electronic device 101 in order to acquire information on a previously specified function that will be executed according to an embodiment.

Referring to FIG. 8A, the electronic device 101 may include the display 311. In one example, the electronic device 101 may display a UI for acquiring information on a previously specified function that will be executed, on the display 311.

In an embodiment, the information on the previously specified function that will be executed may be acquired based a user input. For example, prior to operation 613, the user may input the information on the previously specified function that will be executed through an input/output device (e.g., a touch screen, a keyboard communication module or a sensor) of the electronic device 101.

In an embodiment, the information on the previously specified function that will be executed may include information on a function that will be executed by the electronic device 101 after charging and information on a function that will be executed by the external electronic device 200. In one example, the previously specified function that will be executed may be constructed as an appropriate combination of the function that will be executed by the electronic device 101 and the function that will be executed by the external electronic device 200.

In an embodiment, referring to FIG. 8A, the display 311 of the electronic device 101 may display a UI for selecting at least one of the use combination 1 (801), the use combination 2 (802), the use combination 3 (803), the use combination 4 (804), and the use combination 5 (805). These combinations are the previously specified functions that will be executed.

In an embodiment, the UI may include various visual elements such as text, image, animation, video, and/or icon.

In an embodiment, by touching the display 311, the user may select at least one of the use combination 1 (801), the use combination 2 (802), the use combination 3 (803), the use combination 4 (804), and the use combination 5 (805).

In an embodiment, the user may select a function that will be executed by the electronic device 101 after charging and a function that will be executed by the external electronic device 200. For example, when intending to select, as the previously specified functions that will be executed, the function A that will be executed by the external electronic device 200 and the function C that will be executed by the electronic device 101, the user may touch a UI corresponding to the use combination 1 (801), in the example shown in Table 2.

In an embodiment, the processor 310 may acquire, based on the user input, the information on the previously specified function that will be executed.

Figure 8B:
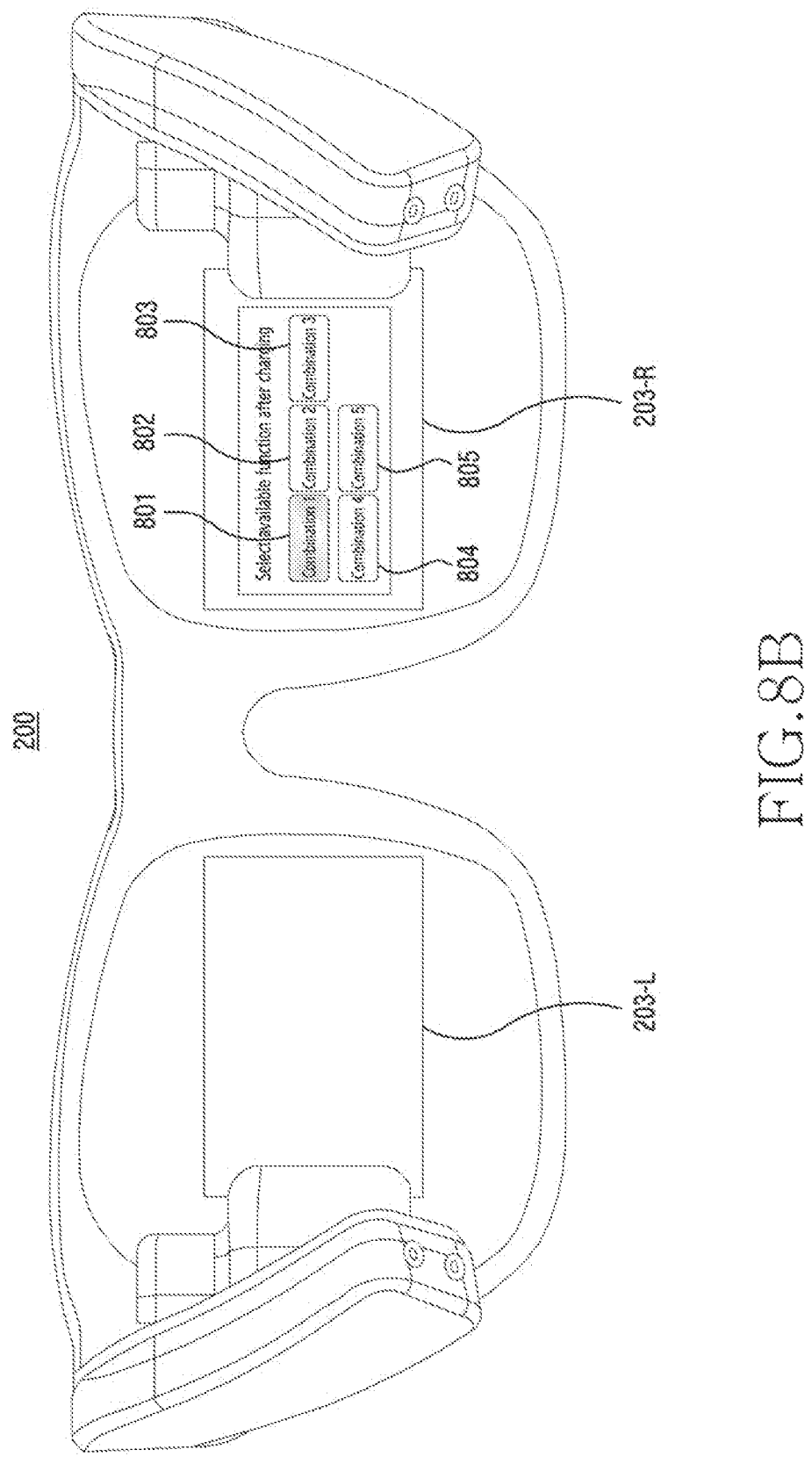
FIG. 8B is a diagram illustrating a user interface (UI) displayed on a display of an external electronic device in order to acquire information on a previously specified function that will be executed according to an embodiment.

FIG. 8B is a diagram illustrating a UI displayed on the display 203-R of the external electronic device 200 in order to acquire information on a previously specified function that will be executed according to an embodiment.

Referring to FIG. 8B, the external electronic device 200 may include the first display 203-L and the second display 203-R.

In an embodiment, the external electronic device 200 may display the UI for acquiring the information on the previously specified function that will be executed, on the first display 203-L and/or the second display 203-R.

In an embodiment, referring to FIG. 8B, the display 203 of the external electronic device 200 may display a UI for selecting at least one of the use combination 1 (801), the use combination 2 (802), the use combination 3 (803), the use combination 4 (804) and the use combination 5 (805), as the previously specified function that will be executed.

In an embodiment, the electronic device 101 may transmit information on the UI to the external electronic device 200 in order to acquire the information on the previously specified function that will be executed. The external electronic device 200 may receive the information on the UI from the electronic device 101 and output the received information to the first display 203-L and/or the second display 203-R.

In an embodiment, before the external electronic device 200 is connected to the electronic device 101 through the second interface 340, the user may perform an input for selecting at least one of the use combination 1 (801), the use combination 2 (802), the use combination 3 (803), the use combination 4 (804), and the use combination 5 (805) of the UI displayed through the first display 203-L and/or the second display 203-R. For example, the input selected by the user may include at least one of an input to the first display 203-L and/or the second display 203-R, a gesture input through the first cameras 205-L and 205-R and/or the third camera 209, a gaze-based input through the second cameras 207-L and 207-R, or a voice input through the microphones 217-L, 217-R, and 217-C.

In an embodiment, when the user inputs the information on the previously specified function that will be executed, through the input to the UI, the external electronic device 200 may transmit the inputted information on the previously specified function that will be executed, to the electronic device 101.

Figure 8C:
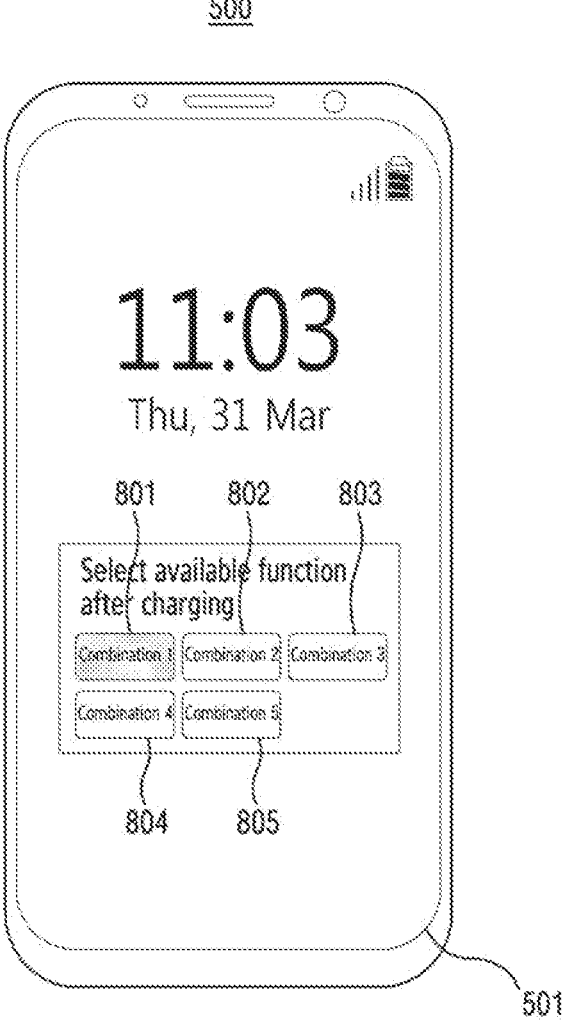
FIG. 8C is a diagram illustrating a user interface (UI) displayed on a display of a user device in order to acquire information on a previously specified function that will be executed according to an embodiment.

FIG. 8C is a diagram illustrating a user interface (UI) displayed on the display 501 of the user device 500 in order to acquire information on a previously specified function that will be executed according to an embodiment.

In an embodiment, referring to FIG. 8C, the display 501 of the user device 500 may display a UI for selecting at least one of the use combination 1 (801), the use combination 2 (802), the use combination 3 (803), the use combination 4 (804), and the use combination 5 (805) as the previously specified function that will be executed.

In an embodiment, the electronic device 101 may transmit information on the UI to the user device 500 in order to acquire the information on the previously specified function that will be executed. The user device 500 may receive the information on the UI from the electronic device 101 and output the received information to the display 501.

In an embodiment, a user may select at least one of the use combination 1 (801), the use combination 2 (802), the use combination 3 (803), the use combination 4 (804), and the use combination 5 (805) through a touch of the display 501 on which the UI is displayed.

In an embodiment, when the user inputs the information on the previously specified function that will be executed through an input to the UI, the user device 500 may cause the transmission of the inputted information on the previously specified function that will be executed to the electronic device 101.

According to another embodiment, the user device 500 may display the UI for selecting at least one of the use combination 1 (801), the use combination 2 (802), the use combination 3 (803), the use combination 4 (804), and the use combination 5 (805), based on information on the electronic device 101 and the external electronic device 200 that are connected to the user device 500 by short-range communication. The user device 500 may transmit information on one combination selected among the UI, to the electronic device 101. For example, the electronic device 101 may control the charger circuitry 320, based on the information received from the user device 500.

Figure 9:
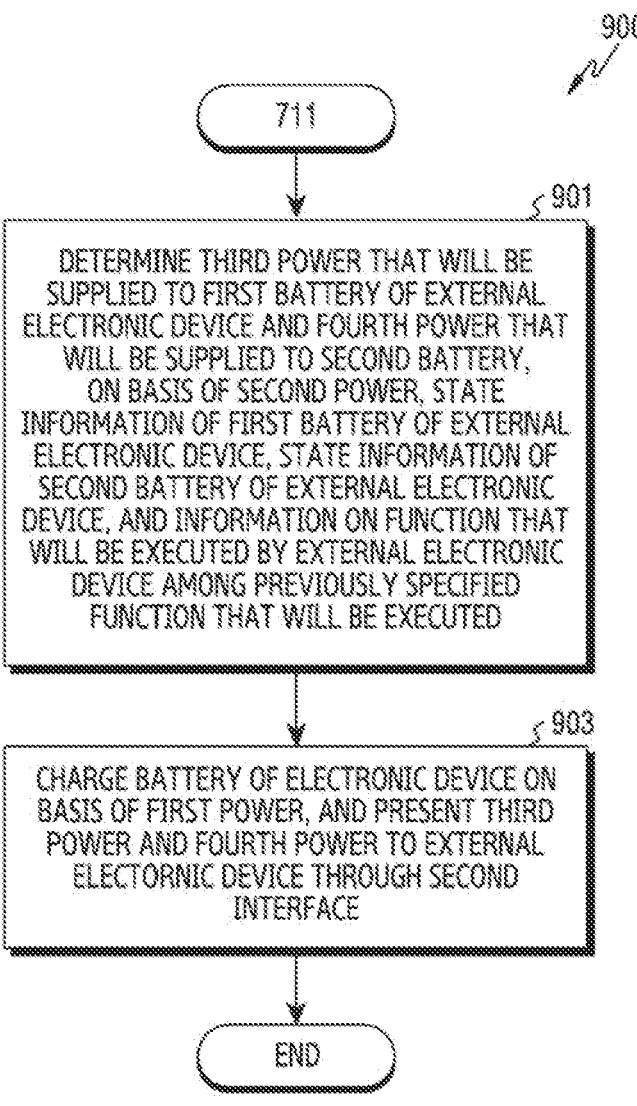
FIG. 9 is a flowchart illustrating a method for controlling the charging of an electronic device and an external electronic device according to an embodiment.

FIG. 9 is a flowchart 900 illustrating a method for controlling the charging of the electronic device 101 and the external electronic device 200 according to an embodiment.

Referring to FIG. 9, operation 701 to operation 711 of FIG. 7 are identically applied here and thus, duplicate or repeated description is omitted below and operations of FIG. 9 are described.

According to an embodiment, in operation 901, the electronic device 101 (e.g., the processor 310 of FIG. 3) may determine third power that will be supplied to the first battery 221-L of the external electronic device 200 and fourth power that will be supplied to the second battery 221-R, based on second power, state information of the first battery 221-L of the external electronic device 200, state information of the second battery 221-R of the external electronic device 200, and information on the function that will be executed by the external electronic device 200.

In an embodiment, the external electronic device 200 may include the first battery 221-L and the second battery 221-R. In one example, a component positioned at the left side of the external electronic device 200 may be driven by power outputted from the first battery 221-L when the external electronic device 200 is worn. A component positioned at the right side of the external electronic device 200 may be driven by power outputted from the second battery 221-R when the external electronic device 200 is worn.

In an embodiment, the process of determining the third power that will be supplied to the first battery 221-L and the fourth power that will be supplied to the second battery 221-R may be the same as the process of determining the first power that will be supplied to the battery 350 and the second power that will be supplied to the external electronic device 200.

In an embodiment, the state information of the external electronic device 200 may include state information of the battery 221 of the external electronic device 200. In one example, the state information of the battery 221 of the external electronic device 200 may include state information of the first battery 221-L and state information of the second battery 221-R. In one example, the state information of the first battery 221-L may include the capacity of the first battery 221-L when fully charged state and/or the state of charge of the first battery 221-L. The state information of the first battery 221-L may include information on the remaining amount of the first battery 221-L. The state information of the second battery 221-R may include the capacity of the second battery 221-R when fully charged state and/or the state of charge of the second battery 221-R. The state information of the second battery 221-R may include information on the remaining amount of the second battery 221-R.

In an embodiment, information on a previously specified function that will be executed may include information on a function that will be executed by the electronic device 101 and information on a function that will be executed by the external electronic device 200. In one example, the information on the function that will be executed by the external electronic device 200 may include information on a function that is executed using power outputted from the first battery 221-L and information on a function that is executed using power outputted from the second battery 221-R.

In an embodiment, a hardware component (e.g., a component of FIG. 2) of the external electronic device 200 may execute a function by using the power outputted from the first battery 221-L or the second battery 221-R. For example, a processor (e.g., the processor 220 of FIG. 4A) of the external electronic device 200 may be operated using the power outputted from the first battery 221-L. A communication module (not shown) may be operated using the power outputted from the second battery 221-R.

In an embodiment, the electronic device 101 (e.g., the processor 310 of FIG. 3) may control third power supplied to the first battery 221-L of the external electronic device 200 and fourth power supplied to the second battery 221-R of the external electronic device 200 such that a function executed by the external electronic device 200 by the power outputted from the first battery 221-L and a function executed using the power outputted from the second battery 221-R may be executed during the same time period after charging.

The previously specified function that will be executed may include a function that will be executed by the external electronic device 200. The function that will be executed by the external electronic device 200 may include the function A or the function B.

Among the previously specified function that will be executed, the function that will be executed by the external electronic device 200 may include the function A (e.g., a function in which the external electronic device 200 outputs general contents to the second display 203-R).

Among the previously specified function that will be executed, the function that will be executed by the external electronic device 200 may include the function B (e.g., all functions the external electronic device 200 performs using a camera).

In an embodiment, the electronic device 101 (e.g., the processor 310) may determine an expected use time of the first battery 221-L and an expected use time of the second battery 221-R, based on information on the function that will be executed by the external electronic device 200 among the previously specified function that will be executed, state information on the first battery 221-L, and state information on the second battery 221-R.

In an embodiment, the expected use time of the first battery 221-L may mean a time until the first battery 221-L is fully discharged when the function that will be executed using the power outputted from the first battery 221-L among the function that will be executed by the external electronic device 200 is performed, based on information on the remaining amount of the first battery 221-L before charging.

In an embodiment, the expected use time of the second battery 221-R may mean a time until the second battery 221-R is fully discharged when the function that will be executed using the power outputted from the second battery 221-R among the function that will be executed by the external electronic device 200 is performed, based on information on the remnant amount of the second battery 221-R, before charging.

In an embodiment, the expected use time of the first battery 221-L may be determined by using Equation 1. For example, in Equation 1, the expected use time of the electronic device 101 may be replaced with the expected use time of the first battery 221-L, and the consumed power of the electronic device 101 may be replaced with the consumed power of the first battery 221-L, and the remaining amount of the battery 350 of the electronic device 101 may be replaced with the remaining amount of the first battery 221-L.

In an embodiment, the consumed power of the first battery 221-L may mean the magnitude of power consumed by the function that will be executed by the power outputted from the first battery 221-L.

In an embodiment, the expected use time of the second battery 221-R may be determined by using Equation 2. For example, in Equation 2, the expected use time of the external electronic device 200 may be replaced with the expected use time of the second battery 221-R, and the consumed power of the external electronic device 200 may be replaced with the consumed power of the second battery 221-R, and the remaining amount of the battery 221 of the external electronic device 200 may be replaced with the remaining amount of the second battery 221-R.

In an embodiment, the consumed power of the second battery 221-R may mean the magnitude of power consumed by the function that will be executed by the power outputted from the second battery 221-R.

In an embodiment, the electronic device 101 (e.g., the processor 310) may determine the weight of the first battery 221-L and the weight of the second battery 221-R, based on information on the function that will be executed by the external electronic device 200, the expected use time of the first battery 221-L acquired using Equation 1, and the expected use time of the second battery 221-R acquired using Equation 2.

In an embodiment, the weight of the first battery 221-L may mean a parameter for controlling third power that will be supplied to the first battery 221-L such that the function that will be executed using the power outputted from the first battery 221-L and the function that will be executed using the power outputted from the second battery 221-R may be executed during the same time period after charging.

In an embodiment, the weight of the second battery 221-R may mean a parameter for controlling fourth power that will be supplied to the second battery 221-R such that the function that will be executed using the power outputted from the first battery 221-L and the function that will be executed using the power outputted from the second battery 221-R may be executed during the same time period after charging.

In an embodiment, the weight of the first battery 221-L may be determined by using Equation 3. For example, in Equation 3, the weight of the electronic device 101 may be replaced with the weight of the first battery 221-L, and the power consumption of the electronic device 101 may be replaced with the power consumption of the first battery 221-L, and the power consumption of the external electronic device 200 may be replaced with the power consumption of the second battery 221-R, and the expected use time of the external electronic device 200 may be replaced with the expected use time of the second battery 221-R, and the expected use time of the electronic device 101 may be replaced with the expected use time of the first battery 221-L.

In an embodiment, the weight of the second battery 221-R may be determined using Equation 4. The weight of the external electronic device 200 may be replaced with the weight of the second battery 221-R. The power consumption of the electronic device 101 may be replaced with the power consumption of the first battery 221-L, and the power consumption of the external electronic device 200 may be replaced with the power consumption of the second battery 221-R, and the expected use time of the external electronic device 200 may be replaced with the expected use time of the second battery 221-R, and the expected use time of the electronic device 101 may be replaced with the expected use time of the first battery 221-L.

In an embodiment, the electronic device 101 (e.g., the processor 310 of FIG. 3) may determine third power that will be supplied to the first battery 221-L and fourth power that will be supplied to the second battery 221-R, based on the second power, the weight of the first battery 221-L acquired using Equation 3, and the weight of the second battery 221-R acquired using Equation 4.

In an embodiment, the third power that will be supplied to the first battery 221-L may be determined using Equation 5. For example, in Equation 5, the charging power supplied to the electronic device 101 can be replaced with the charging power supplied to the first battery 221-L, and the weight of the electronic device 101 can be replaced with the weight of the first battery 221-L, and the weight of the external electronic device 200 can be replaced with the weight of the second battery 221-R, and the power supplied by the external power supply 360 can be replaced with the second power.

In an embodiment, the fourth power that will be supplied to the second battery 221-R may be determined using Equation 6. For example, in Equation 6, the charging power supplied to the external electronic device 200 may be replaced with the charging power supplied to the second battery 221-R, and the weight of the electronic device 101 may be replaced with the weight of the first battery 221-L, and the weight of the external electronic device 200 may be replaced with the weight of the second battery 221-R, and the power supplied by the external power supply 360 can be replaced with the second power.

Table 4 shows information on components that use the power outputted from the first battery 221-L and information on components that use the power outputted from the second battery 221-R, when the function that will be executed by the external electronic device 200 is the function A in an embodiment.

TABLE 4

| consumed power (1 W) of function A of external electronic device 200 | | | | | |
|---|---|---|---|---|---|
| left system first battery (221-L) capacity (2.25 Wh) | | | right system second battery (221-R) capacity (2.25 Wh) | | |
| function | consumed power (W) | expected use time (Hr) when battery is fully charged | function | consumed power (W) | expected use time (Hr) when battery is fully charged |
| camera | — | | camera | — | |
| display | — | | display | 0.6 W | |
| processor | 0.3 W | | communi- cation module | 0.1 W | |
| total | 0.3 W | 7.5 Hr | total | 0.7 W | 3.2 Hr |

Referring to Table 4, the function that will be executed by the external electronic device 200 may be the function A. In this case, a processor (e.g., the processor 220 of FIG. 4A) may be driven using the power outputted from the first battery 221-L, and a display (e.g., the second display 203-R) and a communication module may be driven using the power outputted from the second battery 221-R.

Referring to Table 4, the capacity of the first battery 221-L is about 2.25 Wh, and power consumed by the function executed using the power outputted from the first battery 221-L is about 0.3 W. In this case, the expected time of the first battery 221-L acquired by using Equation 1 may be 7.5 hours.

Referring to Table 4, the capacity of the second battery 221-R is about 2.25 Wh, and power consumed by the function executed using the power outputted from the second battery 221-R is about 0.7 W. In this case, the expected time of the second battery 221-R acquired by using Equation 2 may be about 3.2 hours.

Table 5 is a table showing power supplied to the first battery 221-L and power supplied to the second battery 221-R, when the function that will be executed by the external electronic device 200 is the function A in an embodiment.

TABLE 5

| function A of external electronic device 200 (consumed power 1 W) | | | | | | | |
|---|---|---|---|---|---|---|---|
| first battery (221-L) consumed power 0.3 W | | second battery (221-R) consumed power 0.7 W | | weight | | supplied power | |
| embodiment | remnant amount (Wh) | expected use time (hr) | remnant amount (Wh) | expected use time (hr) | first battery (221-L) | second battery (221-R) | first battery (221-L) | second battery (221-R) |
| embodiment 1 | 0.6 Wh | 2 hr | 1.4 Wh | 2 hr | 0.15 | 0.35 | 0.3 of second power | 0.7 of second power |

Referring to Table 5, the processor 310 may determine third power that will be supplied to the first battery 221-L and fourth power that will be supplied to the second battery 221-R, based on information on the remaining amount of the first battery 221-L, the remaining amount of the second battery 221-R, and the function that will be executed by the external electronic device 200 among the previously specified functions that will be executed.

Referring to Table 5, when the consumed power of the first battery 221-L is about 0.3 W and the remnant amount of the first battery 221-L is about 0.6 Wh, the expected use time of the first battery 221-L acquired using Equation 1 may be about 2 hours.

In an embodiment, when the consumed power of the second battery 221-R is about 0.7 W and the remnant amount of the second battery 221-R is about 1.4 Wh, the expected use time of the second battery 221-R acquired using Equation 2 may be about 2 hours.

Referring to Table 5, the weight of the first battery 221-L acquired by using Equation 3 may be 0.15, and the weight of the second battery 221-R acquired by using Equation 4 may be 0.35. The weight of the second battery 221-R may be higher than that of the first battery 221-L. This may mean that the fourth power that will be supplied to the second battery 221-R is higher than the third power that will be supplied to the first battery 221-L.

In an embodiment, the third power that will be supplied to the first battery 221-L may be acquired using Equation 5, based on the weight of the first battery 221-L, the weight of the second battery 221-R, and the second power.

In an embodiment, the fourth power that will be supplied to the second battery 221-R may be acquired using Equation 6, based on the weight of the first battery 221-L, the weight of the second battery 221-R, and the second power.

Referring to Table 5, the third power that will be supplied to the first battery 221-L may be about 0.3 of the second power. The fourth power that will be supplied to the second battery 221-R may be about 0.7 of the second power.

In an embodiment, in operation 903, the electronic device 101 (e.g., the processor 310 of FIG. 3) may charge the battery 350 of the electronic device 101, based on the first power, and may present the third power and the fourth power to the external electronic device 200 through the second interface 340.

In an embodiment, the processor 310 may charge the battery 350, based on the first power, through the charger circuitry 320.

In an embodiment, the external electronic device 200 may charge the first battery 221-L through the first charging module 212-L by using the third power supplied from the electronic device 101.

In an embodiment, the external electronic device 200 may charge the second battery 221-R through the second charging module 212-R by using the fourth power supplied from the electronic device 101.

FIG. 10 is a block diagram of an electronic device 1001 in a network environment 1000 according to an embodiment. For example, the electronic device 1001 may include one of the electronic device 101 of FIG. 5, the external electronic device 200, and/or the user device 500.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to certain embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device 101 of an embodiment may include a housing including an internal space for accommodating the external electronic device 200, the first interface 330 connected to the external power supply 360 in one region of the housing, the second interface 340 connected to the external electronic device 200 in one region of the internal space, the battery 350 disposed inside the housing, the charger circuitry 320 configured to be electrically connected to at least one of the first interface 330, the second interface 340, the battery 350, and the external electronic device 200, and the at least one processor 310 electrically connected to the charger circuitry 320. The at least one processor 310 may determine information on a charging type of the external power supply 360 connected through the first interface 330, acquire state information of the external electronic device 200 connected through the second interface 340, acquire state information of the battery 350, determine a first power that will be supplied to the battery 350 and a second power that will be supplied to the external electronic device 200, based on at least one of the state information of the battery 350, the state information of the external electronic device 200, the information on the charging type of the external power supply 360, and information on a previously specified function that will be executed, and charge the battery 350 based on the first power, and transmit the second power to the external electronic device 200 through the second interface 340.

In an embodiment, the electronic device 101 may further include the display 311, and the at least one processor 310 may display a user interface (UI) for selecting the previously specified function that will be executed through the display 311, and acquire the information on the previously specified function that will be executed, based on a user input to the UI.

In an embodiment, the at least one processor 310 may determine the first power and the second power such that the electronic device 101 and the external electronic device 200 perform the previously specified function that will be executed during the same time period.

In an embodiment, the state information of the external electronic device 200 may include battery state information of the external electronic device 200.

In an embodiment, the previously specified function that will be executed may include a combination of a function that will be executed by the electronic device 101 and a function that will be executed by the external electronic device 200.

In an embodiment, the function that will be executed by the electronic device 101 may include at least one of a function of charging the external electronic device 200, a function of controlling the external electronic device 200, and a function as an auxiliary computing device of the external electronic device 200.

In an embodiment, the external electronic device 200 may include the first battery 221-L and the second battery 221-R, and the at least one processor 310 may determine a third power that will be supplied to the first battery 221-L and a fourth power that will be supplied to the second battery 221-R, based on the second power, state information of the first battery 221-L, state information of the second battery 221-R, and information on the function that will be executed by the external electronic device 200.

In an embodiment, the electronic device 101 may further include the communication module 313, and the at least one processor 310 may transmit information on a UI for selecting the previously specified function that will be executed, to the external electronic device 200 through the communication module 313, and acquire the information on the previously specified function that will be executed from the external electronic device through the communication module, based on a user input to the UI.

In an embodiment, the electronic device 101 may further include a communication module 313, and the at least one processor 310 may transmit information on a UI for selecting the previously specified function that will be executed so that the UI is displayed on the display 311 of the user device 500 wirelessly connected through the communication module 313.

In an embodiment, the external electronic device 200 may a pair of smart glasses, and the electronic device 101 may be a case of the smart glasses.

A method of operating the electronic device 101 of an embodiment may include detecting that the external power supply 360 is connected through the first interface 330, determining information on a charging type of the external power supply 360 connected through the first interface 330, acquiring state information of the external electronic device 200 connected through the second interface 340, acquiring state information of the battery 350 included in the electronic device 101, determining a first power that will be supplied to the battery 350 of the electronic device 101 and a second power that will be supplied to the external electronic device 200, based on the battery state information of the electronic device 101, the state information of the external electronic device 200, the information on the charging type of the external power supply 360, and information on a previously specified function that will be executed, and charging the battery 350 based on the first power, and transmitting the second power to the external electronic device 200 through the second interface 340.

In an embodiment, the method may further include displaying, by the electronic device 101, a user interface (UI) for selecting the previously specified function that will be executed through the display 311 of the electronic device 101, and acquiring the information on the previously specified function that will be executed, based on a user input to the UI.

In an embodiment, the method may include determining the first power and the second power such that the electronic device 101 and the external electronic device 200 perform the previously specified function during the same time period.

In an embodiment, the state information of the external electronic device 200 may include information on the battery 350 of the external electronic device 200.

In an embodiment, the previously specified function that will be executed may include a combination of a function that will be executed by the electronic device 101 and a function that will be executed by the external electronic device 200.

In an embodiment, the function that will be executed by the electronic device 101 may include at least one of a function of charging the external electronic device 200, a function of controlling the external electronic device 200, and a function as an auxiliary computing device of the external electronic device 200.

In an embodiment, the external electronic device 200 may include the first battery 221-L and the second battery 221-R, and the method may further include determining a third power that will be supplied to the first battery 221-L and a fourth power that will be supplied to the second battery 221-R, based on the second power, the state information of the first battery 221-L, the state information of the second battery 221-R, and information on the function that will be executed by the external electronic device 200.

In an embodiment, the method may further include transmitting information on a UI for selecting the previously specified function that will be executed, to the external electronic device 200, and acquiring the information on the previously specified function that will be executed from the external electronic device, based on a user input to the UI.

In an embodiment, the method may further include transmitting, by the electronic device 101, information on a UI in order to display the UI on the display 311 of the wirelessly connected user device 500 for selecting the previously specified function that will be executed, by using the communication module 313.

In an embodiment, the external electronic device 200 may be a pair of smart glasses, and the electronic device 101 may be a case of the smart glasses.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

The invention claimed is:

1. An electronic device comprising:
a housing including an internal space for accommodating an external electronic device;
a first interface configured to be connected to an external power supply in one region of the housing;
a second interface configured to be connected to the external electronic device in one region of the internal space;
a battery disposed inside the housing;
a charger circuitry configured to be electrically connected to the first interface, the second interface, the battery; and at least one processor electrically connected to the charger circuitry,
wherein the at least one processor is configured to:
determine a charging type of the external power supply when connected through the first interface,
acquire state information of the external electronic device when connected through the second interface, wherein the state information of the external electronic device comprises an indication of a user selected one of a first function and a second function to be performed by the external electronic device,
acquire state information of the battery,
determine a first power supplied to the battery and a second power supplied to the external electronic device, based on the state information of the battery, the user selected one of the first function or the second function to be performed by the external electronic device, the charging type of the external power supply, and
charge the battery based on the first power using the external power supply connected through the first interface, and transmit the second power based on the user selected one of the first function or the second function to be performed by the external electronic device to the external electronic device through the second interface, wherein:
when the user selects a first one of the first function and the second function, charging the battery based on the first power comprises charging the battery with a first amount of charging power, wherein the first amount of charging power is determined based on an expected amount of power consumed by the processor, camera, display, and communication module by performing the first one of the first function and the second function by the external electronic device; and
when the user selects a second one of the first function and the second function, charging the battery based on the first power comprises charging the battery charging the battery with a second amount of charging power, wherein the first amount of charging power is determined based on an expected amount of power consumed by the processor, camera, display, and communication module by performing the first one of the first function and the second function by the external electronic device.

2. The electronic device of claim 1, further comprising a display,
wherein the at least one processor is further configured to:
display a user interface (UI) for selecting a previously specified function that will be executed through the display, and
acquire the information on the previously specified function that will be executed, based on a user input to the UI.

3. The electronic device of claim 1, wherein the at least one processor is further configured to determine the first power and the second power such that the electronic device and the external electronic device perform a previously specified function that will be executed during a same time period.

4. The electronic device of claim 1, wherein the state information of the external electronic device further comprises battery state information of the external electronic device.

5. The electronic device of claim 1, wherein a previously specified function that will be executed comprises a combination of a function that will be executed by the electronic device and a function that will be executed by the external electronic device.

6. The electronic device of claim 5, wherein the external electronic device further comprises a first battery and a second battery, and the at least one processor is further configured to determine a third power that will be supplied to the first battery and a fourth power that will be supplied to the second battery, based on the second power, state information of the first battery, state information of the second battery, and information on the function that will be executed by the external electronic device.

7. The electronic device of claim 1, further comprising a communication module, wherein the at least one processor is further configured to:

transmit information on a user interface (UI) for selecting a previously specified function that will be executed, to the external electronic device through the communication module, and acquire the information on the previously specified function that will be executed from the external electronic device through the communication module, based on a user input to the UI.

8. The electronic device of claim 1, further comprising a communication module, the at least one processor is further configured to transmit information on a user interface (UI) for selecting a previously specified function that will be executed so that the UI is displayed on a display of a user device wirelessly connected through the communication module.

9. The electronic device of claim 1, wherein the external electronic device is a pair of smart glasses, and the electronic device is a case of the smart glasses.

10. A method of operating an electronic device, comprising:

detecting that an external power supply is connected through a first interface;

determining a charging type of the external power supply connected through the first interface;

acquiring state information of an external electronic device when connected through a second interface, wherein the state information of the external electronic device comprises an indication of a user selected one of a first function and a second function to be performed by the external electronic device;

acquiring state information of a battery comprised in the electronic device;

determining a first power supplied to the battery of the electronic device and a second power supplied to the external electronic device, based on the state information of the battery of the electronic device, the user selected one of the first function or the second function to be performed by the external electronic device, and the charging type of the external power supply; and charging the battery based on the first power using the external power supply when connected through the first interface, and transmitting the second power based on based on the user selected one of the first function or the second function to be performed by the external electronic device the function performed by the external electronic device to the external electronic device through the second interface, wherein:

when the user selects a first one of the first function and the second function, charging the battery based on the first power comprises charging the battery with a first amount of charging power, wherein the first amount of charging power is determined based on an expected amount of power consumed by the processor, camera, display, and communication module by performing the first one of the first function and the second function by the external electronic device; and when the user selects a second one of the first function and the second function, charging the battery based on the first power comprises charging the battery with a second amount of charging power, wherein the first amount of charging power is determined based on an expected amount of power consumed by the processor, camera, display, and communication module by performing the first one of the first function and the second function by the external electronic device.

11. The method of claim 10, further comprising:

displaying, by the electronic device, a user interface (UI) for selecting a previously specified function that will be executed through a display of the electronic device; and acquiring the information on the previously specified function that will be executed, based on a user input to the UI.

12. The method of claim 10, further comprising determining the first power and the second power such that the electronic device and the external electronic device perform a previously specified function during a same time period.

13. The method of claim 10, wherein the state information of the external electronic device further comprises information on the battery of the external electronic device.

14. The method of claim 10, wherein a previously specified function that will be executed comprises a combination of a function that will be executed by the electronic device and a function that will be executed by the external electronic device.

15. The method of claim 14, wherein the external electronic device further comprises a first battery and a second battery, and the method further comprises determining a third power that will be supplied to the first battery and a fourth power that will be supplied to the second battery, based on the second power, the state information of the first battery, the state information of the second battery, and information on the function that will be executed by the external electronic device.

16. The method of claim 10, further comprising:

transmitting information on a user interface (UI) for selecting a previously specified function that will be executed, to the external electronic device; and acquiring the information on the previously specified function that will be executed from the external electronic device, based on a user input to the UI.

17. The method of claim 10, further comprising transmitting, by the electronic device, information on a user interface (UI) in order to display the UI on a display of a wirelessly connected user device for selecting a previously specified function that will be executed, by using a communication module.

18. The method of claim 10, wherein the external electronic device is a pair of smart glasses, and the electronic device is a case of the smart glasses.

* * * * *